United States Patent
Yao et al.

(10) Patent No.: US 10,724,922 B1
(45) Date of Patent: Jul. 28, 2020

(54) COMPLETE CHARACTERIZATION OF POLARIZATION-MAINTAINING FIBERS USING DISTRIBUTED POLARIZATION ANALYSIS

(71) Applicant: General Photonics Corporation, Chino, CA (US)

(72) Inventors: Xiaotian Steve Yao, Diamond Bar, CA (US); Xiaojun Chen, San Gabriel, CA (US)

(73) Assignees: General Photonics Corporation, Chino, CA (US); Suzhou Optoring Technology Co. Ltd., Suzhou (CN)

( * ) Notice: Subject to any disclaimer, the term of this patent is extended or adjusted under 35 U.S.C. 154(b) by 21 days.

(21) Appl. No.: 14/810,473

(22) Filed: Jul. 27, 2015

Related U.S. Application Data

(60) Provisional application No. 62/029,387, filed on Jul. 25, 2014.

(51) Int. Cl.
| | | |
|---|---|---|
| *G01M 11/00* | (2006.01) | |
| *G02B 6/024* | (2006.01) | |
| *G01N 21/23* | (2006.01) | |
| *H04B 10/07* | (2013.01) | |

(52) U.S. Cl.
CPC .......... *G01M 11/331* (2013.01); *G01N 21/23* (2013.01); *G02B 6/024* (2013.01); *H04B 10/07* (2013.01)

(58) Field of Classification Search
CPC ................................................... G01M 11/331
USPC ........................................................ 356/73.1
See application file for complete search history.

(56) References Cited

U.S. PATENT DOCUMENTS

| | | | | |
|---|---|---|---|---|
| 2006/0193550 A1* | 8/2006 | Wawro | ................. | G01N 21/648 385/12 |
| 2010/0103428 A1* | 4/2010 | Heo | ...................... | G01C 19/721 356/460 |
| 2011/0277552 A1* | 11/2011 | Chen | .................... | G01M 11/331 73/763 |
| 2013/0321818 A1* | 12/2013 | Yao | .......................... | G01J 4/02 356/477 |

* cited by examiner

*Primary Examiner* — Kara E. Geisel
*Assistant Examiner* — Omar H Nixon
(74) *Attorney, Agent, or Firm* — Nixon & Vanderhye P.C.

(57) ABSTRACT

Devices, systems and techniques for measuring optical polarization-related parameters in optical materials and devices such as polarization maintaining (PM) fiber links based on polarization crosstalks that spatially distribute over a length of a material such as a PM fiber link.

14 Claims, 14 Drawing Sheets wave packet sequence after PMD fiber wave packet sequence after polarizer

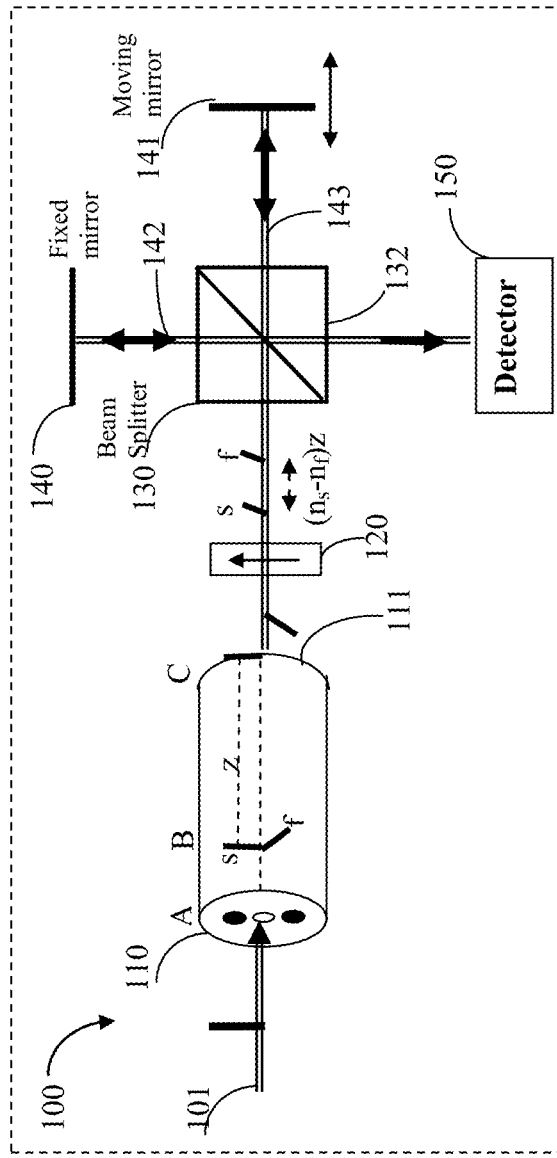
Fig. 1A
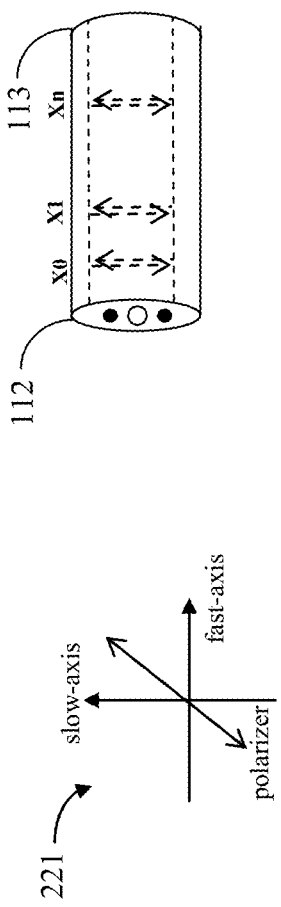
Fig. 1B
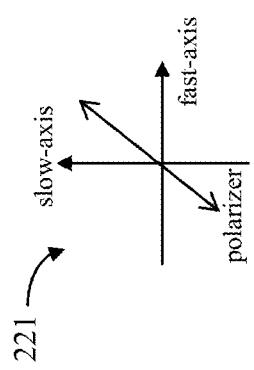
Fig. 1C
FIG. 1

COMPLETE CHARACTERIZATION OF POLARIZATION-MAINTAINING FIBERS USING DISTRIBUTED POLARIZATION ANALYSIS

CROSS REFERENCE TO RELATED APPLICATIONS

This patent document claims the benefit of priority of U.S. Provisional Patent Application No. 62/029,387, entitled "COMPLETE CHARACTERIZATION OF POLARIZATION-MAINTAINING FIBERS USING DISTRIBUTED POLARIZATION ANALYSIS," filed on Jul. 25, 2014 by Applicant and Assignee General Photonics Corporation. The entire content of the before-mentioned patent application is incorporated by reference as part of the disclosure of this application.

TECHNICAL FIELD

This patent document relates to devices, systems and techniques for measuring optical polarization property in optical materials and devices, including polarization-related parameters in polarization maintaining fiber links.

BACKGROUND

Optical polarization is an important parameter of an optical signal in various optical devices, systems and applications. The optical polarization of an optical signal can change or be altered by interacting with an optical medium having optical birefringence in which light experiences different refractive indices at different optical polarizations. Fibers, for example, may be optically birefringent and light propagating in such fibers can change its polarization. The birefringence of a fiber may change with time, often randomly with the fluctuations in the operating conditions such as stresses or temperatures in the fiber.

Polarization maintaining (PM) fiber is an example of an optical birefringent material and exhibits high birefringence and supports two discrete polarization modes, $HE^{slow}_{11}$ and $HE^{fast}_{11}$, that are along mutually orthogonal slow and fast axes of the PM fiber. The refractive index of the PM fiber for light polarized along the slow axis in the mode $HE^{slow}_{11}$ is higher than the refractive index of the PM fiber for light polarized along the fast axis in the mode $HE^{fast}_{11}$. When the light coupled into the PM fiber is linearly polarized along the slow axis of the PM fiber, only $HE^{slow}_{11}$ mode is excited and the optical polarization of the guided light is maintained along the slow axis; conversely, when the light coupled into the PM fiber is linearly polarized along the fast axis of the PM fiber, only $HE^{fast}_{11}$ mode is excited and the optical polarization of the guided light is maintained along the fast axis. This characteristics of preserving optical polarization in the PM fiber can be used in various applications, such as fiber optic gyroscopes, integrated optics devices, high-performance interferometer and Polarimetric sensors, quantum key distribution, and fiber lasers. Perturbations to PM fiber, such as stresses exerted on PM fiber, may cause optical coupling or crosstalk between the two orthogonal polarization modes where optical energy of one polarization mode transfers to optical energy of another polarization mode or vice versa.

An optical fiber tends to be subject to bending, forces or stresses in applications. For example, fibers used for an optical network or fiber communication link, such as International Telecommunication Union recommended ITU-T G.652 single-mode optical fiber and cable, would suffer a fiber bend or stress loss which may adversely affect the performance or reliability of the fiber. Such fiber bending or stress could be measured various ways, including using a commercial multiple-wavelength optical time domain reflectometer (OTDR), e.g. at 1310 nm or 1550 nm, to distinguish a bend loss from other types of losses, e.g. broken, connection loss, etc., uses measured different bend losses information at different wavelengths where usually a bend loss is higher at a short wavelength than that of at a long wavelength.

SUMMARY

This document describes devices, systems and techniques for measuring optical polarization-related parameters in optical materials and devices such as polarization maintaining (PM) fiber links based on polarization crosstalks that spatially distribute over a length of a material such as a PM fiber link.

Disclosed implementations use a ghost-peak-free distributed polarization crosstalk analyzer (DPXA) to accurately obtain all polarization related parameters of polarization-maintaining (PM) fibers. In the specific examples disclosed herein, birefringence related parameters of the PM fiber, including birefringence (or beat length), birefringence variation along the fiber, birefringence dispersion, and birefringence temperature coefficient, can be accurately obtained by first inducing a series equidistant periodic polarization crosstalk peaks along a PM fiber and then measuring the positions and the widths of these peaks using the analyzer. The DPXA can be used to provide to identify and eliminate polarization crosstalk contributions of connectors or splices in the measurement system and therefore can be used to obtain high accuracy measurement of the polarization extinction ratio (PER) of PM fibers. The disclosure also includes a set of parameters based on the distributed polarization analysis to quantitatively evaluate the quality of PM fibers. The disclosed technology can be widely applied in the industry for the complete characterization of PM optical fibers, especially considering that the main instrument (ghost-peak-free DPXA) behind the methods, is already made commercially available.

In one aspect, a device for measuring distribution of polarization coupling in a length of polarization maintain (PM) fiber is provided to include a structure engaged to a length of PM fiber to a series of equidistant periodic polarization crosstalk peaks along the length of PM fiber, the length of PM fiber configured to support two orthogonal polarization modes due to optical birefringence; a mechanism that couples a linearly polarized light of a broadband spectrum into the length of PM fiber; an optical delay device located downstream from the PM fiber in an optical path of an optical output signal out of the PM fiber to produce a modified optical output signal, the optical delay device structured to cause an added optical delay greater than an optical delay between the two orthogonal polarization modes caused by the PM fiber in the optical output signal to produce the modified optical output signal; a linear optical polarizer which is polarized in a direction to cause a mixing between the two orthogonal polarization modes in optical transmission light of the linear optical polarizer, the linear optical polarizer placed in an optical path of the modified optical output signal to produce the optical transmission light; an optical interferometer located to receive the optical transmission light of the linear optical polarizer and structured to obtain optical interference of light between the two orthogonal polarization modes in the PM fiber; and a processing device that processes the obtained optical interference to identify positions and widths of polarization cross talks between the two orthogonal polarization modes in the PM fiber at the induced series of equidistant periodic polarization crosstalk peaks, and uses the determined positions and widths of the induced equidistant periodic polarization crosstalk peaks to extract one or more polarization-related parameters of the PM fiber.

In another aspect, a method is provided for measuring polarization-related parameters in a birefringent material. This method includes inducing a series of equidistant periodic polarization crosstalk peaks along a length-wise direction of a birefringent material; directing probe light into the birefringent material to detect the probe light coming out of the birefringent material; processing the detected probe light to determine positions and widths of the induced equidistant periodic polarization crosstalk peaks; and using the determined positions and widths of the induced equidistant periodic polarization crosstalk peaks to extract one or more polarization-related parameters of the birefringent material.

The above aspects and their implementations are described in greater detail in the drawings, the description and the claims.

BRIEF DESCRIPTION OF DRAWINGS

FIG. 1 shows an exemplary device for measuring spatial distribution of polarization crosstalk in an optical birefringent medium (e.g., a PM fiber) by using an optical interferometer, where FIG. 1A shows the components of the device, FIG. 1B illustrates the orientation of the optical polarizer with respect to optical axes of the PM fiber and FIG. 1C illustrates a situation where stresses are present at multiple locations along the PM fiber to induce cross talk between the two orthogonal polarization modes of the PM fiber.

FIG. 9(a) shows a measured polarization crosstalk curve of 280 meter PM fiber wound on the spool as a function of the interferometer delay $\Delta Z$ inside the DPXA. The peaks at the far right and left correspond to the crosstalks induced at the input and output connectors, respectively, from slightly axis misalignment between light polarization and PM fiber axis. FIG. 9(b) shows that the equidistant periodic crosstalk peaks are induced by squeezing of the metal cylinder on the PM fiber.

FIG. 10(a) shows measured birefringence as a function of distance along the 280 meter fiber with N=5 without applying dispersion compensation. The measurement uncertainty is shown to increase with the distance. FIG. 10(b) shows measured birefringence where the dispersion compensation is applied. The measurement uncertainty at large distances are significantly reduced. The mean value of the birefringence as a function of distance is shown with the red line. In both a) and b), the distance zero is at the position of FUT's output connector.

FIG. 12(a) shows measured polarization cross-talk curves of a PM fiber as a function of the relative delay at 80° C. (blue) and 40° C. (red), FIG. 12(b) shows the expanded view of the positions of the $48^{st}$, $49^{th}$, and $50^{th}$ peaks at 80° C. (blue) and 40° C. (red). F FIG. 12(c) shows measurements of $\Delta n$ obtained at seven different temperatures by measuring the spacing between the $1^{st}$ and the $50^{th}$ crosstalk peaks at different temperatures using Eq. (1). Tests were conducted to measure $\Delta n$ for one PM fiber at seven different temperatures (i.e. −40° C., −20° C., 0° C., 20° C., 40° C., 60° C., 80° C.) and the results are plotted in FIG. 12(c). Linear-fitting $\Delta n$ to Eq. (5) yields a birefringence thermal coefficient γ of −4.123×10$^{-7}$.

FIG. 13(a) shows measured polarization crosstalk curves of a 13 m jumper with two FC/PC connectors and FIG. 13(b) shows measurements of a 250 m PM fiber coil spliced with two FC/PC connectors. PER measurement with a commercial PER always including the contributions of the input connector and two splices, while the DPXA has the ability to identify and eliminate polarization crosstalk contributions of all connectors and splices in the measurement system. The fiber length in the horizontal axis is obtained by dividing the fiber delay line distance $\Delta Z$ with the average birefringence.

FIG. 14(a) shows measurements of a PANDA PM fiber at 1310 nm with a buffer diameter of 250 μm. A defect point is seen at around 220 m. FIG. 14(b) shows measurements of a PANDA fiber at 1310 nm of the same core/cladding diameters in FIG. 14(a) but with a reduced buffer diameter of 169 μm. FIG. 14(c) shows measurements of a third PANDA PM fiber at 1310 nm with the similar cladding diameters as in FIG.

Figure 2:
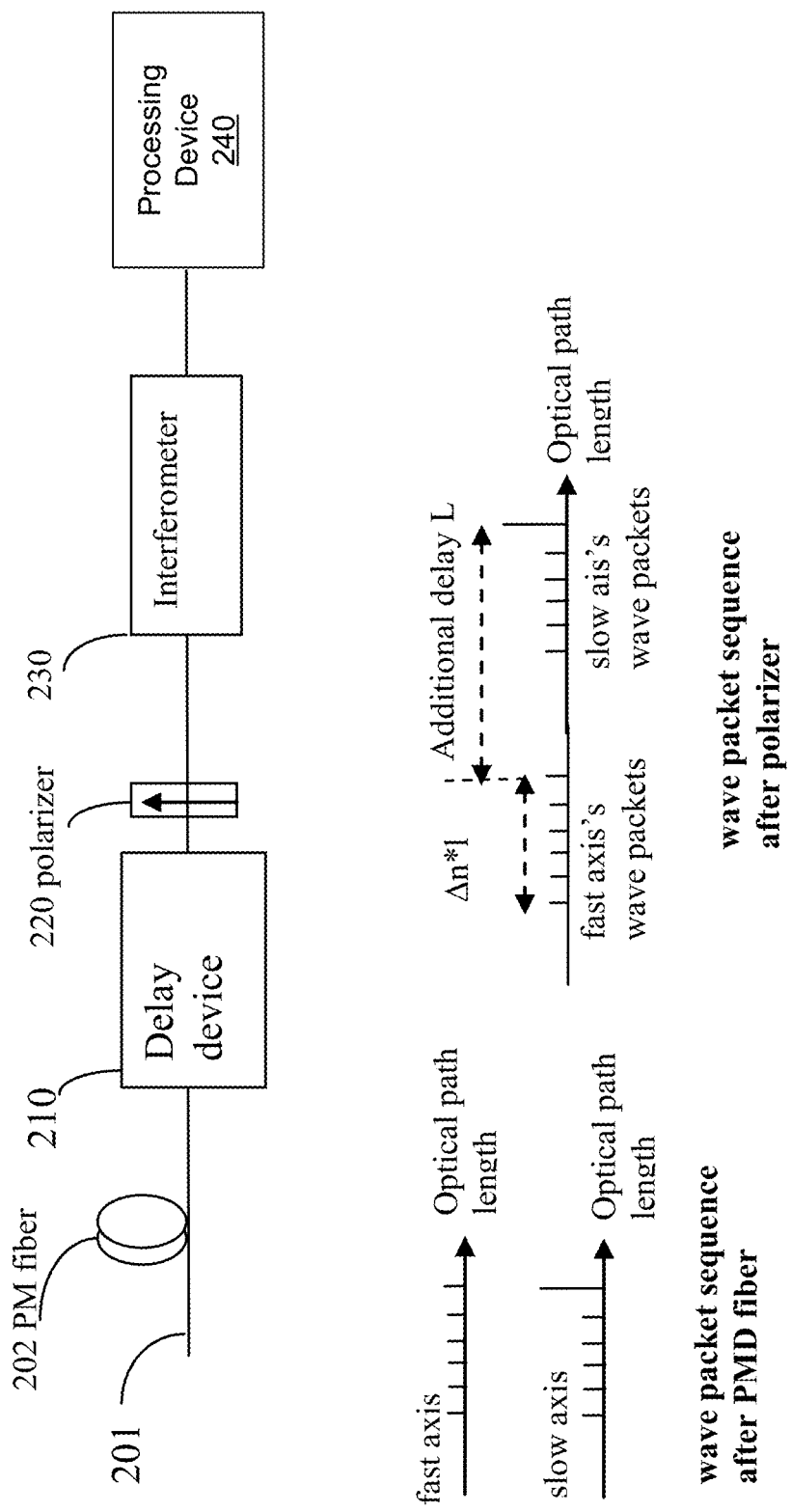
FIG. 2 shows an exemplary device for measuring polarization crosstalk in an optical birefringent medium (e.g., a PM fiber) by providing an optical delay device between the PM fiber under test and the optical interferometer, where inserts further illustrate operation of the device.

14(a) bu with a reduced buffer diameter of 136 Rm. Two major defect points with crosstalk more than 45 dB were observed.

DETAILED DESCRIPTION

This document discloses techniques for using DPXA to obtain additional measurements by providing methods and processes to simplify the measurements and improve measurement accuracy, and to expand the measurement capabilities of DPXA to include various polarization related parameters, including PER (or h-parameter), birefringence, birefringence uniformity, birefringence dispersion, and birefringence thermal coefficient. This patent document incorporates by reference the entire disclosure of U.S. patent application publication No. US2013/0321818A1 as part of the disclosure of this patent document, which was filed as part of the U.S. Provisional Patent Application No. 62/029,387.

Examples for implementing techniques and devices in measuring stress or strain and the spatial distribution of the stress or strain based on polarization crosstalk between two polarization modes in an optical birefringent medium are provided based on optical interferometric measurements of PM fiber. The described techniques and devices can be used to effectively suppress undesired spectral broadening caused by optical birefringent dispersion in the PM fiber. One of the features in the disclosed technology is that broadband light can be used in the described techniques and devices to obtain spatially resolved distribution of stresses along the PM fiber by analyzing stress-induced polarization cross-coupling along the length of the PM fiber. High measurement sensitivity, a wide dynamic range, and high spatial measurement accuracy can be achieved by using the described techniques and devices.

The temperature or spatial temperature distribution in a given structure is another important parameter for various applications. Various temperature sensing techniques are available or known. In many sensing applications, the measurement of the temperature of an object is based on a particular temperature sensing mechanism which tends to be different from the mechanism for measuring stress or strain in the same object. Accordingly, in many applications where both temperature measurements and stress/strain measurements are desirable, two different types of sensors usually used: one or more designated temperature sensors for measuring only temperatures and one or more designated stress/strain sensors for measuring only stress/strain. The optical fiber sensors disclosed in this document provides a unique optical sensing platform that enables the same optical fiber senor to provide both temperature measurements and stress/strain measurements. Therefore, the disclosed optical fiber sensors can be used as a stand-alone temperature sensor, a stand-alone stress/strain sensor, and a sensor that simultaneously measures both temperature and stress/strain from detecting and analyzing the same probe light, therefore providing a unique sensing platform for a wide range of applications by eliminating the need for different type of sensors.

The following sections first describe the physical structures of PM fiber sensors and their operations for measuring the stress/strain and spatial distribution of the stress/strain in an object, and then describe using the same PM fiber sensors for processing the received probe light to extract temperature information or extract both temperature and stress/strain information from the same received probe light.

Fiber optic strain sensors can be engineered to provide one or more advantages including, e.g., high precision, long-term stability, and durability. In addition, fiber optic techniques allow for affordable instrumentation of large areas of civil structures and infrastructure enabling global large-scale monitoring based on distributed sensors. The disclosed technology here includes a novel type of distributed fiber-optic strain sensors based on polarization maintaining (PM) fiber with a desired spatial resolution (e.g., a spatial resolution of around 6 cm), enabled by the ghost-peak free distributed polarization crosstalk analyzer (DPXA) as an interrogator. A strain field over such sensors can lead to crosstalk change in the PM fiber deployed as the stress or strain sensing element, which can be measured by the DPXA. As specific examples, two categories of distributed sensors are disclosed: one-dimensional (1D) sensor strip and two-dimensional (2D) sensor panel, and two specific designs are presented for each category. Sample sensors were tested by conducting tension experiments to quantify the relationship between crosstalk change and applied strain, which shows a linear positive correlation. The test results demonstrate that such 1D or 2D distributed sensors based on PM fiber have the potential in large-scale structural health or integrity monitoring of various structures, including civil infrastructure, both in 1D and 2D, performing as an alternative of traditional fiber-optic strain sensors.

In implementations, an optical fiber sensor device for the disclosed 1D sensor strips or 2D sensor panels can be configure to include a sensor plate formed of a deformable or elastic material, a length of polarization maintaining (PM) fiber as a sensing element and engaged to the sensor plate at multiple engaging locations, an optical light source that produces probe light and is coupled to the PM fiber to deliver the probe light into the PM fiber, and a detector module coupled to receive probe light from the PM fiber and to measure the received probe light to determine a stress exerted on the sensor plate. The engagement mechanism for engaging the PM fiber to the sensor plate is designed to provide multiple engaging or contacting locations that divide the PM fiber into PM fiber sections, either in a 1D linear configuration or in a 2D array configuration, for sensing the changes in the strain or stress distribution at the PM fiber sections at different locations on a target structure such as a device, a building, a bridge or other items. The sensor plate is formed of a deformable or elastic material to allow the sensor plate which is engaged to the target structure to deform with the target structure for the sensing operation.

One of the applications or uses of the disclosed technology is meeting the needs for measuring stress or strain distributions in buildings and other large structures. The structural integrity and safety of buildings and large structures are of a particular concern for various aging civil infrastructures, such as sites identified by several institutions, including the Federal Highway Administration (FHWA), the Transportation and Research Board (TRB), and the National Institute of Standards and Technology (NIST). In 2004, approximately 150,000 U.S. bridges were identified as structurally deficient or functionally obsolete. The American Society of Civil Engineers (ASCE) estimates that if the current deterioration trends for surface transportation infrastructure continue, annual costs on the U.S. economy will increase by 351%, i.e., to $520 billion, by 2040 and will cost the national economy more than 400,000 jobs. The collapse of the I35W Minneapolis Bridge is a representative example of the potentially catastrophic consequences: 13 lives lost and 145 people injured; unavailability of the river crossing, leading to estimated economic losses of $60M; and rebuilding costs of approximately $234M. The budget allocated for maintenance and repair is disproportionately small for appropriately addressing all the problems of these deficient bridges. Thus reliable, low-cost, and easy-to-adopt structural health monitoring is an immediate and urgent need in order to accurately assess the state of bridges, improve the safety of the structures, and set priorities for allocating funds for maintenance and repair. Structural health monitoring (SHM) is a process for providing accurate and in-time information concerning structural health condition and performance. SHM can be used to prevent the adverse social, economic, ecological, and aesthetic impacts that may occur in the case of structural deficiency, and can be critical to the emergence of sustainable civil and environmental engineering.

The sensors disclosed here can be configured as fiber optic strain sensors (FOSS) for SHM applications. Some examples of the advantages of FOSS are high accuracy and long-term stability, durability, and insensitivity to electromagnetic influences, corrosion and humidity. qualitative difference between the monitoring performed using discrete sensors and distributed sensors is the following: discrete sensors monitor strain or average strain in discrete points, while the distributed sensors are capable of one-dimensional (linear) strain field monitoring. Distributed sensors can be installed along the whole length of structure. Since the sensor is sensitive at each point of its length, each cross-section of the structure is effectively instrumented. Discrete and distributed sensors each have their advantages and challenges. Discrete sensors cover less area on the structure (and thus are less likely to directly detect damage), but they feature excellent accuracy and long-term stability. On the other hand, distributed sensors cover large areas of structure, but their accuracy is at least an order of magnitude worse than the accuracy of discrete sensors. Both types of sensor allow successful development of monitoring methods for damage detection and characterization (localization and quantification).

This application discloses implementations of a novel type of distributed fiber-optic strain sensors using polarization maintaining (PM) fiber as the sensing medium. The disclosed technology can be implemented to achieve both advantages of discrete and distributed sensors. For example, the disclosed devices can be configured as distributed 1D or 2D sensors, capable of covering a large spatial span or area of structures; the disclosed devices can be used to provide accurate measurements with a relatively high spatial resolution (e.g., 6 cm in some configurations) and a relatively large sensing range (e.g., more than 3 km in some configurations), which is enabled by a ghost-peak free distributed polarization crosstalk measurement technology developed by General Photonics Corporation.

Various features of techniques and devices or systems for measuring the stress or strain distribution in a PM fiber based on optical interferometric measurements of the PM fiber are related to the technique and devices disclosed in this document and can be found in U.S. Pat. No. 8,599,385 entitled "MEASURING DISTRIBUTED POLARIZATION CROSSTALK IN POLARIZATION MAINTAINING FIBER AND OPTICAL BIREFRINGENT MATERIAL" and assigned to General Photonics Corporation, and U.S. Patent Application Publication No. US2013/0321818 A1 of U.S. patent application Ser. No. 13/482,813 entitled "MEASURING POLARIZATION CROSSTALK IN OPTICAL BIREFRINGENT MATERIALS AND DEVICES BASED ON REDUCTION OF LINE BROADENING CAUSED BY BIREFRINGENT DISPERSION" and assigned to General Photonics Corporation. The entire disclosures of the above two patent documents are incorporated by reference as part of this patent document.

In a PM fiber, when the launched light is perfectly aligned along slow or fast axis at the input of the PM fiber, the optical coupling between the two polarization modes in the PM fiber occurs because intrinsic defects exist in the PM fiber or/and external stresses exerted on the PM fiber. The mode coupling between the slow axis and fast axis of the PM fiber can be characterized with polarization crosstalk. One way to represent the polarization crosstalk is the light intensity ratio between the light in the two polarization modes with optical polarizations along the slow and fast axes, respectively. In practical applications, it is desirable to identify the position of the polarization crosstalk in the PM fiber and to measure the degree of the polarization crosstalk. For example, in some fiber optic gyroscopes applications, the polarization crosstalk measurements can be used to screen the PM fiber before winding PM coil and to control crosstalk degradation during coil winding and to diagnose the PM coil problem after winding. The PM fiber can be used as an optical sensing medium and the polarization crosstalk can be used as a sensing mechanism. For example, the polarization crosstalk measurements can be used to obtain the stress distribution along the PM fiber and monitor space-resolved structural changes along bridges, tunnels, dams, pipeline or pipes for transporting a liquid (e.g., oil) or a gas (e.g., natural gas), or buildings. The polarization crosstalk measurements can also be used to detect an intrusion to a PM fiber link because mechanical disturbances to the PM fiber introduced by the intrusion causes polarization coupling in the PM fiber. The polarization crosstalk measurements can be used for PM fiber quality inspection by identifying defective sections of PM fiber where the crosstalk occurs, enabling the manufacturers or users to remove the defective fiber sections or take preventive measures to mitigate the impact of such defects. The polarization crosstalk measurements can also be used for measuring high polarization extinction ratios of a polarizing waveguide, obtaining the autocorrelation function of a light source, measuring the birefringence of a PM fiber and the lengths of PM fibers and single-mode (SM) fibers, and matching the optical path lengths of an interferometer.

Optical interference between light waves along the slow and fast axes of the PM fiber can generate real optical interference signals generated at the cross coupling locations in the PM fiber and ghost interference signals caused by the multiple coupling of light wave among multiple crosstalk points. The ghost signals can be strong when there are several strong coupling points on PM fiber, and thus result in wrong identification of crosstalk position and amplitude.

FIG. 1 shows an exemplary device 100 for measuring spatial distribution of polarization crosstalk along a PM fiber by using an optical interferometer, where FIG. 1A shows components of the device, FIG. 1B illustrates the orientation of the optical polarizer with respect to optical axes of the PM fiber and FIG. 1C illustrates a situation where stresses are present at multiple locations along the PM fiber to induce cross talk between the two orthogonal polarization modes of the PM fiber.

In this example, a broadband light (101) from a broadband light source is directed into the PM fiber at position A (110). The light (101) has one polarization component aligned to the slow axis of the PM fiber. Stress at position B induces polarization coupling between the two orthogonal polarizations along the fast and slow axes of the PM fiber and produces a polarization component aligned to the fast axis. Because the two polarization components travel at different group velocities in the PM fiber, the two polarization components experience a delay difference at the output (111) of the fiber (position C):

$$\Delta z = n_s z - n_f z = \Delta n z \quad (1)$$

where $n_s$ and $n_f$ are the refractive indices of the slow and fast axes, respectively, the difference between the two refractive indices $\Delta n$ is the birefringence, and z is the distance between the coupling point B and the output point C. If an optical polarizer (120) with its optical polarization axis oriented at 45 degrees from the slow axis (FIG. 1B) is placed after the fiber output (111), one half of the optical power in each of the two polarization components passes through the polarizer (120) and emerges with the same polarization state which is linear, aligned to the polarizer axis of the polarizer (120).

Therefore, when an optical interferometer is used to receive the output light from the polarizer (120), the presence of the polarizer (120) can cause the received light, which includes two polarization components that are respectively in the two polarization modes in the PM fiber, to optically interfere. This optical interference can then be used to perform the polarization crosstalk measurements.

In FIG. 1, a Michelson interferometer is shown as an example for implementing the optical interferometer. A beam splitter 130 is provided to receive the output light from the polarizer 120 and splits the received light into a first beam along a first optical path 142 to a fixed mirror 140 and a second beam along a second optical path 143 to a movable mirror 141. An actuator is engaged to the movable mirror 141 to move the position of the movable mirror 141 to adjust the optical path length of the second optical path 143 relative to the first optical path 142. The two mirrors 140 and 144 reflect the two beams back to retrace the first and second optical paths to reach the beam splitter 130. The reflected beams from the two mirrors 140 and 141 spatially overlap with each other at the beam splitter 130 and optically interfere to produce the optical output 132 which contains the optical interference signal which has periodic interference peaks as the mirror 141 is moved in position. The distance associated with the movement of the mirror 141 between the two adjacent interference peaks in the optical interference signal is $\Delta nz$ and, accordingly, from Eq. (1), the location of the coupling point in the PM fiber is $z = \Delta z / \Delta n$. The coupling point can therefore be located using the interference graph. The coupling ratio can also be calculated from the strength of the interference peaks.

FIG. 1C illustrates presence of multiple coupling points in the PM fiber. Under this condition, the measurement process is more complicated. Assuming there are (n+1) coupling points ($x_0$ $x_1$ $x_2$ ... $x_n$) in the PM fiber, a linearly-polarized input wave packet (112) along the slow axis splits to $2^n$ small wave packets along the slow axis and $2^n$ small wave packets along the fast axis at the output end of PM fiber (113). Therefore, after the ith coupling point, the two wave packets sequences $P_{si}$ and $P_{fi}$ polarized along the slow axis and fast axis respectively include $2^i$ wave packets in each sequence and their optical paths length can be described as $$P_{si} = \begin{pmatrix} P_{s_i,1} \\ P_{s_i,2} \\ \bullet \\ P_{s_i,j} \\ \bullet \\ P_{s_i,2^i} \end{pmatrix} P_{fi} = \begin{pmatrix} P_{f_i,1} \\ P_{f_i,1} \\ \bullet \\ P_{f_i,j} \\ \bullet \\ P_{f_i,2^i} \end{pmatrix} \quad (2)$$

where $P_{si,j}$ (j=1 to $2^i$) and $P_{fi,j}$ (j=1 to $2^i$) represent the optical patch lengths of the jth wave packet in sequences $P_{si}$ and $P_{fi}$, respectively. The optical path length of the wave packet sequences after the (i+1)th coupling point can be calculated by $$P_{s_{i+1}} = P_{f_{i+1}} = \begin{pmatrix} (x_{i+1} - x_i)n_s + P_{s_i 1} \\ (x_{i+1} - x_i)n_s + P_{s_i 2} \\ \bullet \\ (x_{i+1} - x_i)n_s + P_{s_i,2^i} \\ (x_{i+1} - x_i)n_f + P_{f_i 1} \\ (x_{i+1} - x_i)n_f + P_{f_i 2} \\ \bullet \\ (x_{i+1} - x_i)n_f + P_{f_i,2^i} \end{pmatrix}, \quad (3)$$

Based on formula (3), the optical path length of the wave packet at output of PM fiber can be obtained by $$P_{sn} = \quad (4)$$

$$P_{fn} = \begin{pmatrix} (x_n - x_{n-1})n_s + Ps_{n-1,1} \\ (x_n - x_{n-1})n_s + Ps_{n-1;2} \\ \bullet \\ (x_n - x_{n-1})n_s + Ps_{i-1,2^{n-1}} \\ (x_n - x_{n-1})n_f + Pf_{n-1;1} \\ (x_n - x_{n-1})n_f + Pf_{n-1;2} \\ \bullet \\ (x_n - x_{n-1})n_f + Pf_{n-1,2^{n-1}} \end{pmatrix} = \begin{pmatrix} (x_n - x_0)n_s \\ (x_n - x_{n-1})n_s + Ps_{n-1,2} \\ \bullet \\ (x_i - x_{n-1})n_s + Ps_{n-1,2^{n-1}} \\ (x_n - x_{n-1})n_f + Pf_{n-1,1} \\ (x_n - x_{n-1})n_f + Pf_{n-1,2} \\ \bullet \\ (x_n - x_{n-1})n_f + Pf_{n-1,2^{n-1}-1} \\ (x_n - x_0)n_f \end{pmatrix}$$

and the corresponding intensity $I_{sn}$ and $I_{fn}$ of wave packet sequences $P_{sn}$ and $P_{fn}$ can be calculated by the following formulae:

$$Is_n = \frac{Is_{n-1}}{1+c_n} \oplus \frac{c_n}{1+c_n} If_{n-1} = \quad (5)$$

$$\begin{pmatrix} Is_{n-1,1}/(1+c_n) \\ Is_{n-1,2}/(1+c_n) \\ Is_{n-1,3}/(1+c_n) \\ \bullet \\ Is_{n-1,2^{i-1}}/(1+c_n) \\ If_{n-1,1}*c_n/(1+c_n) \\ If_{n-1,2}*c_n/(1+c_n) \\ If_{n-1,3}*c_n/(1+c_n) \\ \bullet \\ If_{n-1,2^{n-1}}*c_n/(1+c_n) \end{pmatrix} \approx \begin{pmatrix} Is_{n-1,1}/(1+c_n) \\ Is_{n-1,2}/(1+c_n) \\ Is_{n-1,3}/(1+c_n) \\ \bullet \\ Is_{n-1,2^{i-1}}/(1+c_n) \\ 0 \\ 0 \\ 0 \\ \bullet \\ 0 \end{pmatrix}$$

-continued $$If_n = \frac{c_n}{1+c_n} Is_{n-1} \oplus \frac{1}{1+c_n} If_{n-1} = \qquad (6)$$

$$\begin{pmatrix} Is_{n-1,1} * c_n/(1+c_n) \\ Is_{n-1,2} * c_n/(1+c_n) \\ Is_{n-1,3} * c_n/(1+c_n) \\ \bullet \\ Is_{n-1,2^{i-1}} * c_n/(1+c_n) \\ If_{n-1,1}/(1+c_n) \\ If_{n-1,2}/(1+c_n) \\ If_{n-1,3}/(1+c_n) \\ \bullet \\ If_{n-1,2^{n-1}}/(1+c_n) \end{pmatrix} \approx \begin{pmatrix} 0 \\ 0 \\ 0 \\ \bullet \\ 0 \\ If_{n-1,1}/(1+c_n) \\ If_{n-1,2}/(1+c_n) \\ If_{n-1,3}/(1+c_n) \\ \bullet \\ If_{n-1,2^{n-1}}/(1+c_n) \end{pmatrix}$$

where $c_n$ is the coupling coefficients at point xn, and can be used to represent a crosstalk parameter defined by Crosstalk=abs($10*\log c_n$).

After passing through the 45° aligned polarizer (120), the two wave packet sequences $P_{sn}$ and $P_{fn}$, originally polarized along the slow axis and fast axis in the PM fiber, will be the mixed into one wave packet sequence polarized along transmission direction of the polarizer (120). The optical path length P and the corresponding optical intensity of the wave packet sequence polarized along transmission direction of the polarizer (120) can be calculated as $$P = \begin{pmatrix} p1 \\ p2 \\ p3 \\ \bullet \\ \bullet \\ \bullet \\ \bullet \\ \bullet \\ p_{2^n} \end{pmatrix} = \begin{pmatrix} (x_n - x_{n-1})n_s \\ (x_n - x_{n-1})n_s + Ps_{n-1,2} \\ \bullet \\ (x_n - x_{n-1})n_s + Ps_{n-1,2^{n-1}} \\ (x_n - x_{n-1})n_f + Pf_{n-1;1} \\ (x_n - x_{n-1})n_f + Pf_{n-1,2} \\ \bullet \\ (x_n - x_{n-1})n_f + Pf_{n-1,2^{n-1}-1} \\ (x_n - x_0)n_f \end{pmatrix} = \begin{pmatrix} P_{s_{n-1}} \\ P_{f_{n-1}} \end{pmatrix} \qquad (7)$$

$$I \approx \begin{pmatrix} Is_{n-1,1}/(1+c_n) \\ Is_{n-1,2}/(1+c_n) \\ Is_{n-1,3}/(1+c_n) \\ \bullet \\ Is_{n-1,2^{i-1}}/(1+c_n) \\ If_{n-1,1}/(1+c_n) \\ If_{n-1,3}/(1+c_n) \\ If_{n-1,3}/(1+c_n) \\ \bullet \\ If_{n-1,2^{n-1}}/(1+c_n) \end{pmatrix} = \begin{pmatrix} Is_{n-1} \\ If_{n-1} \end{pmatrix} \qquad (8)$$

As the mirror 141 moves to change its position in the second optical path, any two pulses in wave packet sequence P (see formula 7) can generate an interference signal and the position of interference pattern is determined by the delay difference between these two pulses. There are total $2^n * (2^n - 1)/2$ peaks that are generated in which there are n interference peaks representing the actual coupling points and the rest of the interference peaks are ghosts peaks. These ghost peaks not only generate fake coupling signals, but also can possibly produce compositions at the true interference peaks associated with the true coupling locations. Therefore, the presence of the ghost peaks degrades the measurement accuracy in measuring the crosstalk distribution and amplitude.

Formulae (7) and (8) show that, the wave packet sequence has two groups, one represented by the top half of Formula (7) and comes from $Psn_{-1}$ polarized along the slow-axis when in the PM fiber, and another is represented by the bottom half of Formula (7) and comes from $Pf_{n-1}$ polarized along the fast axis when in the PM fiber. The positions of interference patterns between any two pulses in the group $Ps_{n-1}$ have nothing to do with the length of the last PM segment ($x_n-x_{n-1}$), and their delay difference are all shorter than the ($x_{n-1}-x0$)*$\Delta$n. The positions of interference patterns between any two pulses in the group $Pf_{n-1}$ also has nothing to do with the length of last PM segment and their delay difference are all less than the ($x_{n-1}-x0$)*$\Delta$n. For the interference between top and bottom half of wave packet P, the delay difference between any one wave packets from group of $Ps_{n-1}$ and $Pf_{n-1}$, respectively, is ($x_n-x_{n-1}$)$\Delta$n+($Ps_{n-1, j}$-$Pf_{n-1, k}$). If the length of the last PM segment $x_n-x_{n-1}$ is longer than the length of the total length ($x_{n-1}-x_0$) of the PM segments from 0 to n−1, the interference peaks will split into two groups at position. One group is generated by the interference between any two wave packets in sequence $Ps_{n-1}$ or $P_{sf-1}$; another group is generated by the interference between one wave packet in sequence Psn−1 and one in $P_{sf-1}$ respectively. A high value for the extinction ratio (ER) of a PM fiber link generally suggests that the coupling coefficients of c1, c2 . . . ci in the PM fiber link are very small so the pulse P1 in formula (7) has a relatively high power. If the wave packets generated by over two times coupling and over three order's interference are ignored, there are only n interference signals in the second interference group and the corresponding delay difference between the first optical path 142 as the reference arm of the optical interferometer (in FIG. 1A) and the second optical path 143 as the changing arm of the optical interferometer are:

$$(x_n - x_{n-1})\Delta n + \begin{pmatrix} 0 \\ (x_{n-1} - x_{n-2})\Delta n \\ (x_{n-1} - x_{n-3})\Delta n \\ \bullet \\ \bullet \\ (x_{n-1} - x_0)\Delta n \end{pmatrix} \qquad (9)$$

which corresponds to the coupling points from 0 to n−1 at the PM fiber.

To reduce the ghost interference peaks, an optical delay can be inserted between the PM fiber and the polarizer (212) to selectively cause an additional delay in light in one of the two polarization modes of the PM fiber. FIG. 2 shows an exemplary device for measuring spatial distribution of polarization crosstalk along a PM fiber by providing an optical delay device between the PM fiber under test and the optical interferometer, where inserts further illustrate operation of the device. The input light (201) is split to two orthogonal sequences wave packets after passing though the PM fiber under test (202) and the two sequences are polarized along the slow-axis and the fast-axis of the PM fiber, respectively. The delay device 210 adds an additional delay L between these two orthogonal wave packet sequences, and the delay L in vacuum should be longer than $\Delta$n*l where $\Delta$n is the birefringence of the PM fiber and l is the length of the PM fiber and the additional delay L is added to the light polarized along the slow axis of the PM fiber in this example. After passing the 45 degree aligned polarizer (220), these two sequences of wave packets with the additional delay L are mixed together with the same polarization state defined by the polarizer (220). An optical interferometer 230 is provided downstream from the polarizer (22) to produce a serial of interference signals at delays between $\Delta n*l$ and $(L-\Delta n*l)$, these interference signals only correspond the real signals caused by polarization coupling at coupling locations and ghosts peaks are suppressed or eliminated. A processing device 240 is provided to receive the output of the optical interferometer 230 and processes the data in the output to generate the measurements for the locations of coupling points in the PM fiber and the magnitudes of the coupling at the respective coupling points.

Consider a situation where there are three coupling points x1, x2 and x3 along the PM fiber and the light input to the PM fiber has no fast axis component and is polarized along the slow axis of the PM fiber. At each coupling point, light is coupled not only from the polarization mode along the slow axis to the polarization mode along the fast axis, but also from the polarization mode along the fast axis to the polarization mode along the slow axis. As a result of this coupling, the resulted wave packet series output by the PM fiber include wave packets caused by multiple couplings.

After passing through the 45° oriented analyzer, the wave packets aligned to the slow and fast axes will be mixed together. If this mixed light is input to an interferometer, a series of interference peaks can be observed as the delay in one arm of the interferometer is changed. Generated interference peaks represent both actual coupling points in the PM fiber and ghost peaks which do not correspond to actual coupling points in the PM fiber and thus can undesirably cause errors in identification of the actual coupling points. Ghost peaks can also be superimposed on the real peaks, reducing the crosstalk measurement accuracy.

In order to suppress the number and magnitude of the undesired ghost peaks, the delay device 210 in FIG. 2 can be inserted between the PM fiber's output and the polarizer's input. This delay device is polarization selective and can add an additional delay between the slow axis and the fast axis of the PM fiber. Thus, the two wave packet sequences from the fast-axis and slow-axis are separated in time after the light passes through the analyzer. If we preset the same delay offset between the fixed and moving arms in the interferometer, the zero order, second order and most higher order interference signals will not be generated as the delay line scans; therefore, most of the ghost peaks disappear during measurement. Consequently, the device in FIG. 2 has higher position measurement accuracy, higher dynamic range and higher sensitivity than other interferometer-based devices such as the device in FIG. 1.

The polarization-selective optical delay device (210) in FIG. 2 can be implemented in various configurations and can be selected based on the needs of a particular application for the device (210) in FIG. 2. Light in the two polarization modes of the PM fiber can be separated into two optical signals along two separate paths by using a polarization beam splitter and a variable optical delay mechanism can be used to cause a variable optical delay between the two separated optical signals before recombining the two separated signals into a combined optical signal for subsequent processing by the downstream linear optical polarizer and the optical interferometer. These examples can be configured as fixed optical delay devices that produce a desired optical delay $\Delta L(>\Delta n*l$ where l is the length of PM fiber under test) or a variable delay that can be controlled to be at the above desired optical delay $\Delta L$. The ghost peaks can be suppressed by using the proper delay as shown in FIG. 2 as described in U.S. Patent Publication No. US 2011/0277552 A1 under U.S. patent application Ser. No. 14/780,593 entitled "Measuring distributed polarization crosstalk in polarization maintaining bier and optical birefringent material" and filed on May 14, 2010, which is incorporated by reference as part of the disclosure of this document.

Space-resolved polarization cross-talk measurements along a polarization maintaining (PM) fiber have various applications, including distributed stress sensing, fiber gyro coil inspection, PM fiber birefringence and beat length measurement, polarization cross-talk location identification in a PM fiber interferometer system, and PM fiber quality inspection. Scanning Michelson white light interferometers can be used to obtain such distributed polarization cross-talk measurements. Unfortunately, as the length of the fiber under test (FUT) increases, the measured cross-talk peaks will be broadened due to birefringence dispersion, resulting in reduced spatial resolution and degraded cross-talk measurement accuracies for PM fibers with a length exceeding certain lengths, e.g., a few hundred meters.

The techniques provided here can be used for improving the resolution and accuracy of distributed polarization cross-talk measurements in a polarization maintaining (PM) fiber against its birefringence dispersion. In some implementations, the broadening of measured polarization cross-talk peaks caused by birefringence dispersion can be restored by simply multiplying the measurement data with a compensation function. The birefringence dispersion variable in the function can be obtained by finding the widths of measured cross-talk envelops at known distances along the fiber. This technique can effectively improve spatial resolution and amplitude accuracy of the space-resolved polarization cross-talk measurements of long PM fibers.

Figure 3:
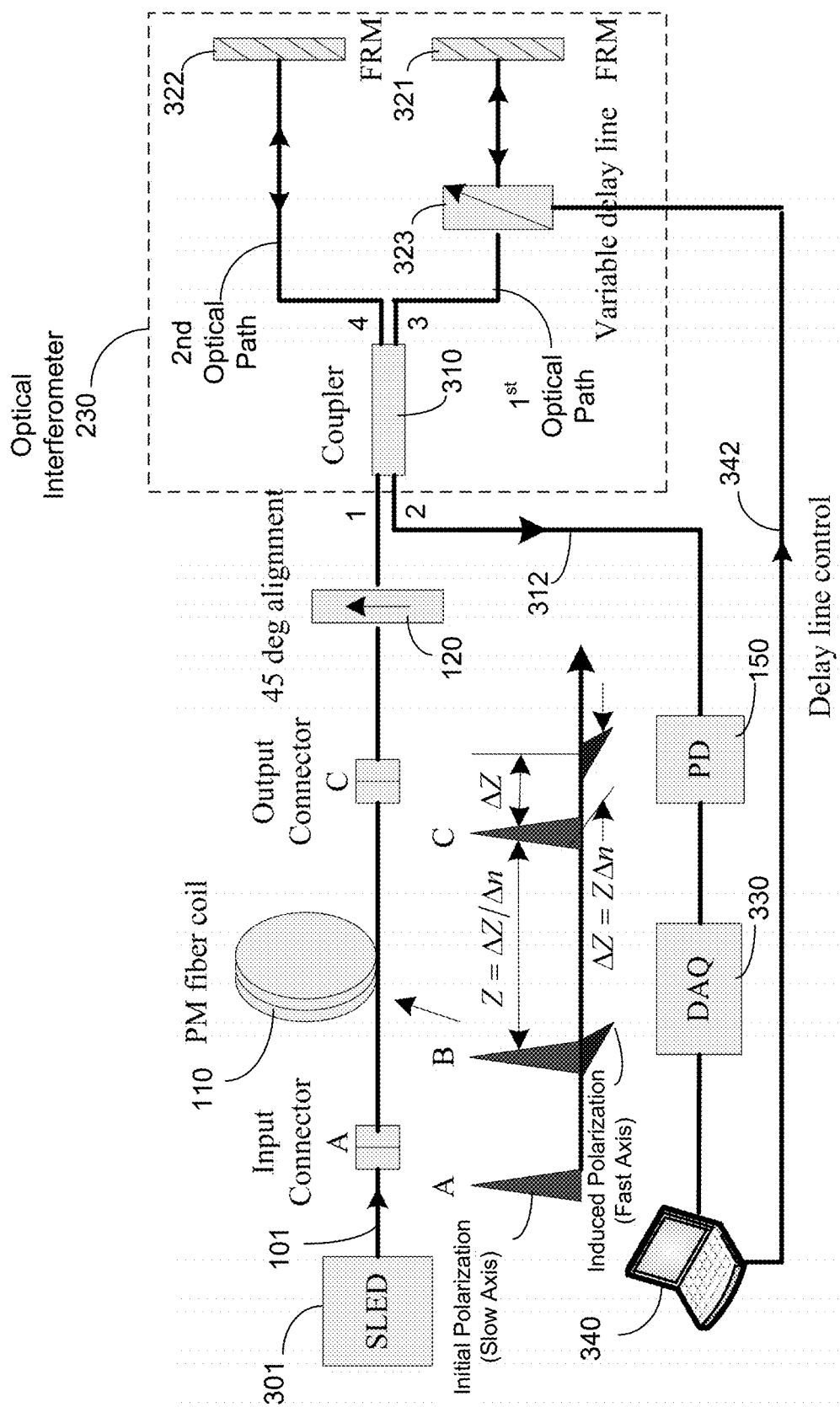
FIG. 3 shows an example device for measuring polarization crosstalk in an optical birefringent medium based on applying a birefringent dispersion compensation function.

In the following sections, implementations details are provided for mathematically compensating the birefringence dispersion in polarization cross-talk measurements of a PM fiber to improve the spatial resolution and measurement accuracy. An example of the compensation function is derived to demonstrate that the effect of birefringence dispersion on polarization-cross-talk measurements can be compensated mathematically. An exemplary white light interferometer based distributed polarization cross-talk analyzer is described. This device was used to measure the initial space-resolved polarization cross-talk peaks along the PM fiber and the spectral widths of the cross-talk peaks as a function of their location along the fiber to obtain the birefringence dispersion $\Delta D$ for the dispersion compensation function. In addition, numerical multiplication of the compensation function with the original measured cross-talk data is performed to eliminate the dispersion induced broadening of the cross-talk peaks. Experiments conducted with a PM fiber coil of 1.05 km length demonstrates that the method is effective in improving the spatial resolution and cross-talk measurement accuracy and can be readily incorporated in the analysis software. The described technology can be used in various applications, e.g., obtaining accurate polarization cross-talk measurements of PM fiber coils with lengths of longer than a few hundred meters and can be used to use the externally triggered crosstalk and the measurements of such crosstalk for various measurements and sensing applications FIG. 3 shows an example of a device for measuring a PM fiber coil. This device can function as a distributed polarization crosstalk analyzer. A polarized broadband light source 301 is coupled into one of the principal polarization axes of an optical birefringent medium 110. Such a polarized broadband light source 301 can be implemented in various configurations, such as a combination of a broadband light source and an optical polarizer. In the example in FIG. 3, the polarized broadband light source 301 is shown as a polarized super luminescent diode source (SLED) with a short coherence length. The polarized output light 101 is directed to be aligned with the slow axis of a PM fiber 110 at point A which is an input fiber connector for connecting the PM fiber coil 110. The PM fiber coil 110 terminates at the output connecter C to output light to an optical linear polarizer 120 which is oriented at an angle with respect to the two principal polarization axes of the PM fiber coil 110, e.g., at 45 degrees. Referring to FIG. 1B, the polarizer 120 transmits part of the light output from the PM fiber coil 110 and mixes the two orthogonal polarizations together.

The PM fiber coil 110 is an optical birefringent medium that supports two orthogonal polarization modes along the PM fiber slow and fast principal axes and the input polarization of the light 101 is aligned with one of the principal polarization axes at the input point A, e.g., the slow axis. The optical output signal out of the optical birefringent medium 110 is directed the optical interferometer 230 to obtain optical interference of light between the two orthogonal polarization modes. The optical interferometer 230 produces an optical interference signal 312. A photodetector 150 is used to convert the signal 312 into a detector signal that carries the optical interference information. A data acquisition device or card (DAQ) 330 is used to covert the detector signal into data and a processor 340, e.g., a microprocessor or computer, is used to receive the data and processes the obtained optical interference to obtain an envelope spectral function of a polarization crosstalk between the two orthogonal polarization modes in the optical birefringent medium 110. Notably, the processor 340 is programmed to apply a compensation function based on measurements of the optical birefringent medium 110 to the envelope spectral function to reduce a spectral broadening in the envelope spectral function caused by optical birefringent dispersion in the optical birefringent medium 110.

The optical interferometer 230 in FIG. 3 is a fiber-based optical interferometer that includes a fiber coupler 310 with four fiber ports: port 1 as the interferometer input for receiving light from the polarizer 120, port 2 as the interferometer output port for sending out the signal 312, port 3 for connecting to a first optical path of the interferometer 230 and port 4 for connecting to a second optical path of the interferometer 230. The fiber coupler 310 splits the input light into a first beam to the port 3 and the first optical path and a second beam to the port 4 and the second optical path. The first optical path includes a fiber which terminates at a first Faraday mirror 321 which rotates polarization of light by 45 degrees in one pass and thus produces a 90-degree rotation in the polarization of the reflected light. Similarly, the second optical path includes a fiber which terminates at a second Faraday mirror 321 which produces a 90-degree rotation in the polarization of the reflected light. The reflected light beams from both the first and second optical paths are then mixed at the fiber coupler 310 to cause interference based on the optical path length difference between the first and second optical paths. This is a Michelson interferometer. A variable delay mechanism is provided to control the relative delay between the two paths. For example, a variable delay element 323 is placed in the first optical path in FIG. 3 to adjust and control the relative delay in response to a delay control signal 342 from the processor which further operates as a control device. In operation, the variable delay element 323 is scanned to operate the interferometer 230 as a scanning Michelson interferometer.

Consider an example in FIG. 3 where, at point B in the PM fiber coil 110, a polarization cross talk is induced by an external disturbance and some light is coupled from the initial input polarization at point A along the slow axis of the PM fiber coil 110 into the fast axis of the PM fiber 110 with a coupling coefficient parameter represented by the intensity or power ratio between the two polarizations $h=I_1/I_2$, where $I_1$ and $I_2$ are the powers in the fast and slow axes of the PM fiber 110, respectively. Because light polarized along the fast axis travels faster than that along the slow axis, at the output point C of the fiber 110, the faster component is ahead of the slow component by $\Delta n Z$, where $\Delta n$ is the group birefringence of the PM fiber 110 and Z is the fiber length between the cross-talk point B and the fiber end at point C. The polarizer 120 oriented at 45° to the slow axis placed at the output of the fiber projects both polarization components onto the same direction to cause interference between the two components in a scanning Michelson interferometer 230. When the relative optical path length is scanned, an interference peak appears when the polarization components overlap in space and disappears when they are separated more than the coherence length of the light source 301. The location B where the cross-talk occurs can be calculated from $z=\Delta z/\Delta n$ and cross-talk amplitude h can be obtained from the interference signal amplitude. FIG. 3 shows a train of the signals at three locations A, B and C in the PM fiber coil 110 illustrating polarization components along the slow axis and the fast axis.

The envelope of a measured cross-talk peak (the interference peak) is influenced by the spectral distribution of the light source 301 and the birefringence dispersion $\Delta D$ of the PM fiber 110. Assume that the SLED 301 has a Gaussian spectral shape, the cross-talk envelope (the degree of coherence) $\gamma$ can be derived as the function of birefringence dispersive $\Delta D$ and the distance Z of cross-talk point measured from the output:

$$|\gamma(Z, \Delta D)| = \frac{\sqrt{h-h^2}}{(1+\rho^2)^{1/4}} \exp\left\{-\left[\frac{2\delta d}{(1+\rho^2)^{1/2} W_0}\right]^2\right\} \quad (10)$$

where $$\delta d = (\Delta n Z - d) \quad (11)$$

$$\rho = 2\pi c (\Delta\lambda/\lambda_0)^2 \Delta D Z = \alpha \Delta D Z \quad (12)$$

$$\Delta D = d\tau/d\lambda = [\omega^2/2\pi c](d^2\Delta\beta/d\omega^2)_0 \quad (13)$$

In the equations above, d is the path length imbalance of the scanned Michelson interferometer, $\rho$ is the accumulated birefringence dispersion along the fiber, c is the speed of light in free space, $\Delta\lambda$ and $\lambda_0$ are the spectral width and center wavelength of the light source, $\Delta\beta$ is the propagation constant difference of two polarization eigenmodes, $W_0$ is the 1/e width of the interference envelope when the dispersion $\rho$ is zero. This width is also the coherence length of the light source. Based on Eq. (11), the parameter $\delta d$ can be adjusted by varying the path length difference d of the delay line in the interferometer. The interference signal appears when the path length imbalance d compensates for optical path length difference $\Delta n Z$ between two polarization modes. Eq. (11) to Eq. (13) indicate that both the magnitude and the shape of the measured cross-talk envelope are functions of $\Delta D$ and Z. The degrading effects of birefringence dispersion ΔD on a cross-talk measurement are the reduction of the cross-talk envelope's amplitude and the broadening its shape as Z increases.

Notably, the effects of birefringence dispersion can be directly removed by multiplying the cross-talk measurement data with a dispersion compensation function K(ρ):

$$K(\rho) = \sqrt[4]{1+\rho^2} \exp\left\{-\left[\frac{2\delta d\rho}{(1+\rho^2)^{1/2} W_0}\right]^2\right\} \quad (14)$$

Therefore, the original cross-talk envelope can be completely restored by simply multiply Eq. (14) with Eq. (10):

$$\gamma(Z, \Delta D) \cdot K(\rho) = \sqrt{h-h^2} \exp\left[-\left(\frac{2\delta d}{W_0}\right)^2\right] \quad (15)$$

In order to complete the compensation function, the birefringence dispersion ΔD or ρ must be obtained first. From Eq. (10) one yields the relation between envelop broadening and birefringence dispersion as:

$$W/W_o = (1+\rho^2)^{1/2} = (1+(\alpha\Delta D)^2 Z^2)^{1/2} \quad (16)$$

Therefore, in principle the birefringence dispersion ΔD can be readily calculated by measuring the widths of cross-talk envelops at input (Z=L) and output (Z=0) ends of the PM fiber. In practice, in order to increase the accuracy of ΔD, widths of cross-talk envelops at multiple locations along the PM fiber are measured and ΔD is obtained by curve-fitting to Eq. (16).

Figure 4:
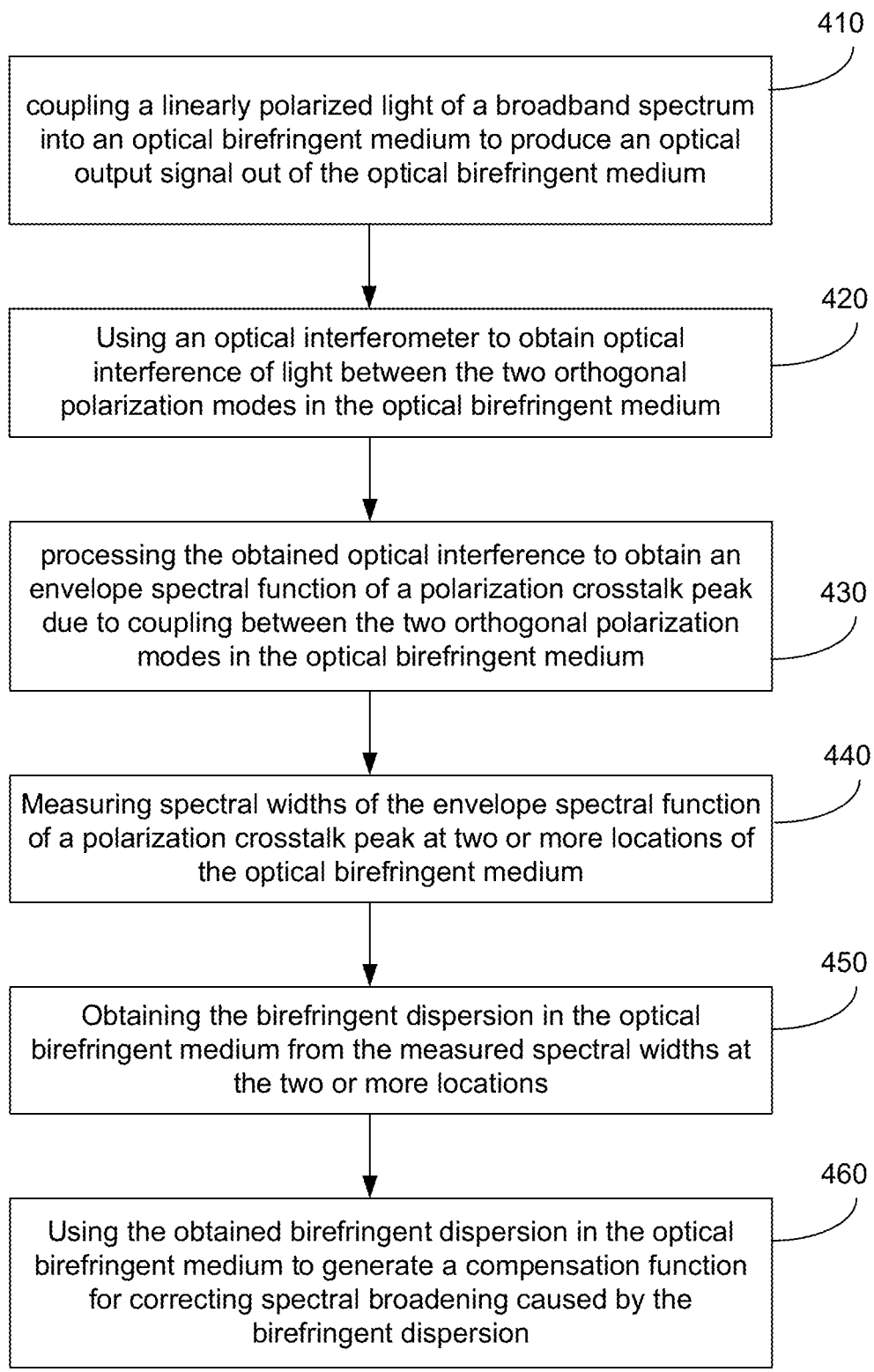
FIG. 4 shows an example of a process for obtaining the birefringent dispersion compensation function based on measuring spectral widths of the envelope spectral function of a polarization crosstalk peak at two or more locations of the optical birefringent medium.
Figure 5:
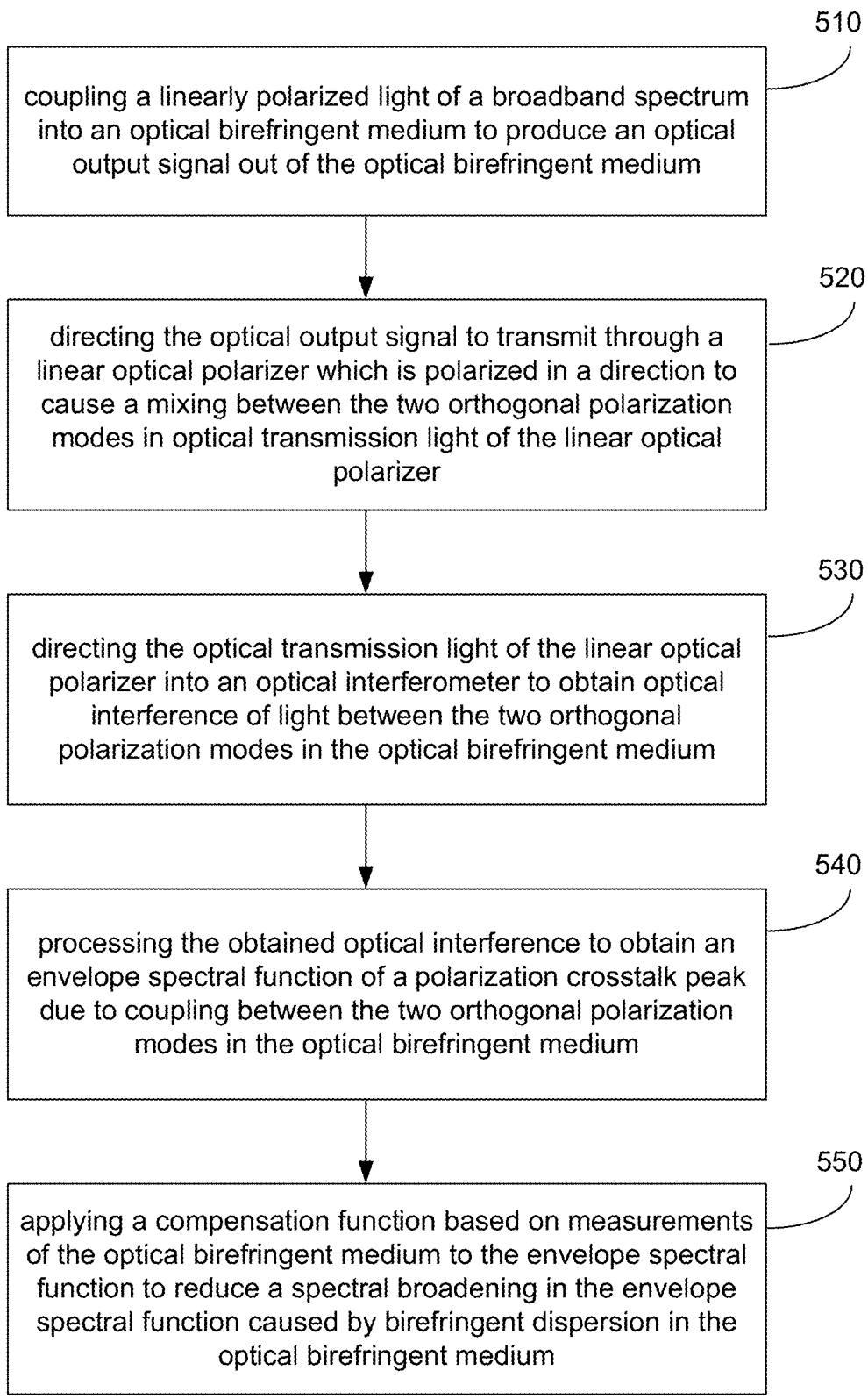
FIG. 5 shows an example of a process for measuring the polarization crosstalk in an optical birefringent medium such as PM fiber based on applying a birefringent dispersion compensation function.

FIGS. 4 and 5 illustrate operational processes of the device in FIG. 3.

FIG. 4 shows an example of a process for obtaining the birefringent dispersion compensation function based on measuring spectral widths of the envelope spectral function of a polarization crosstalk peak at two or more locations of the optical birefringent medium. At 410, a linearly polarized light of a broadband spectrum is coupled into the optical birefringent medium in a direction along which the optical birefringent medium supports two orthogonal polarization modes due to optical birefringence to produce an optical output signal out of the optical birefringent medium. At 420, the optical interferometer is used to process the optical output signal to obtain optical interference of light between the two orthogonal polarization modes in the optical birefringent medium. At 430, the obtained optical interference from the optical interferometer is processed to obtain an envelope spectral function of a polarization crosstalk peak due to coupling between the two orthogonal polarization modes in the optical birefringent medium. At 440, spectral widths of the envelope spectral function of a polarization crosstalk peak are measured at two or more locations of the optical birefringent medium, e.g., the input point A and output point B in FIG. 3. Step 450 is carried out to obtain the birefringent dispersion in the optical birefringent medium from the measured spectral widths at the two or more locations. At step 460, the obtained birefringent dispersion in the optical birefringent medium is used to generate the compensation function for correcting spectral broadening caused by the birefringent dispersion.

Based on the birefringent dispersion compensation function obtained in FIG. 4, FIG. 5 shows an example of a process for measuring the polarization crosstalk in an optical birefringent medium such as PM fiber based on applying the birefringent dispersion compensation function.

Figure 6:
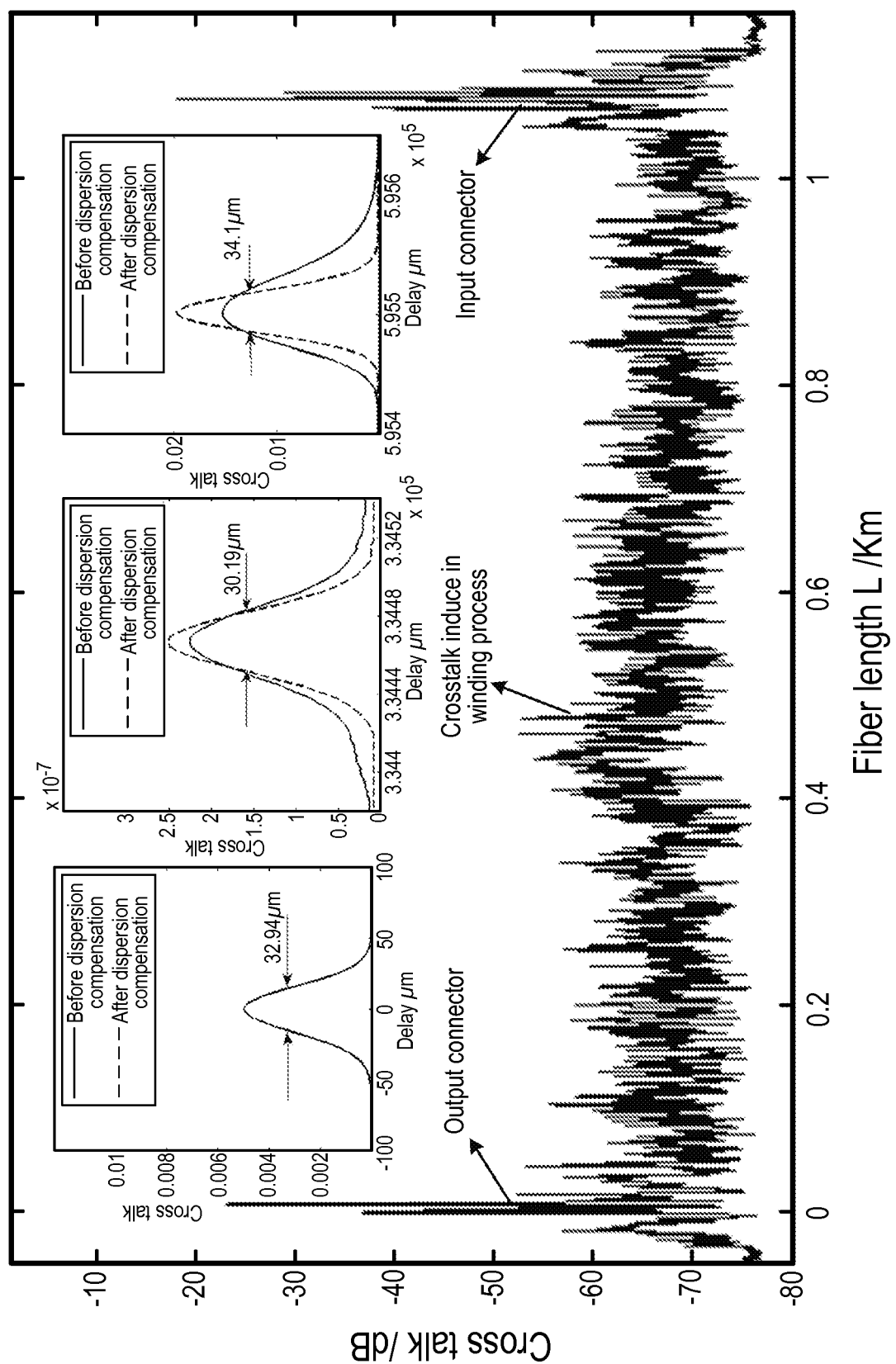
FIG. 6 shows an example of a polarization cross-talk curve of a PM fiber coil. The inserts show both the amplitude and width of cross-talk envelopes at output and input connectors, as well as in the middle region of the fiber before (solid line) and after (dotted line) birefringence dispersion compensation.

FIG. 6 is a measured polarization cross-talk curve of a PM fiber coil based on FIG. 3, showing the effects of birefringence dispersion on the measured cross-talk peaks and how the compensation removes those effects. The peaks at far left and far right correspond to cross-talks induced at output and input connectors A and C from slight fiber axis misalignment. The small peaks in between are the cross-talks induced by stresses during fiber winding process. The solid line in the right insert shows that birefringence dispersion causes two adverse effects: (1) broadening the envelop and (2) diminishing the amplitude of the cross-talk peak occurred at input connector A. The dotted line shows that both the envelop and the amplitude of the cross-talk peak are restored after dispersion compensation is performed. In particular, the envelope width of the peak at input connector is 34.1 μm after dispersion compensation, which is close to 32.4 μm of the left peak induced by the output connector C with zero dispersion (Z=0).

Figure 7A:
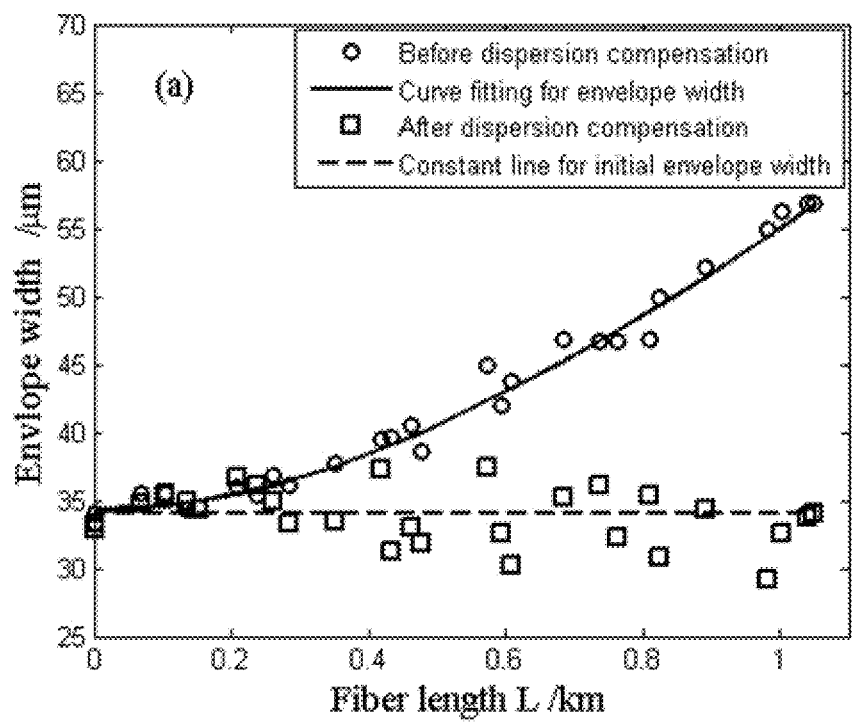
FIG. 7A shows exemplary measurements of the envelop widths of crosstalk peaks induced by stress at various locations PM fiber samples by using the system in FIG. 3.

FIG. 7A shows the measured envelope width as a function of the distance Z. in various tests conducted by using the system shown in FIG. 3. Measurements for multiple polarization cross-talks were performed at different locations along the PM fiber under test. The measurements clearly show that the width increases quadratically with distance Z due to the effect of birefringence dispersion. This behavior is in agreement with Eq. (16). Under the condition of the tests with the PM fiber used, such width broadening due to birefringence dispersion starts to degrade the spatial resolution of polarization cross-talk measurements for distance larger than about two hundred meters.

The birefringence dispersion ΔD of the PM fiber is then accurately obtained by the least-squares fitting the data to Eq. (16) to be 0.0014 ps/(km nm). Substituting the fitting obtained values of αΔD into Eq. (14), we complete the dispersion compensation function. Multiplication of the dispersion compensation function with the original measured cross-talk data produces a modified cross talk data where the dependence of polarization cross-talk on birefringence dispersion ΔD is canceled.

Figure 7B:
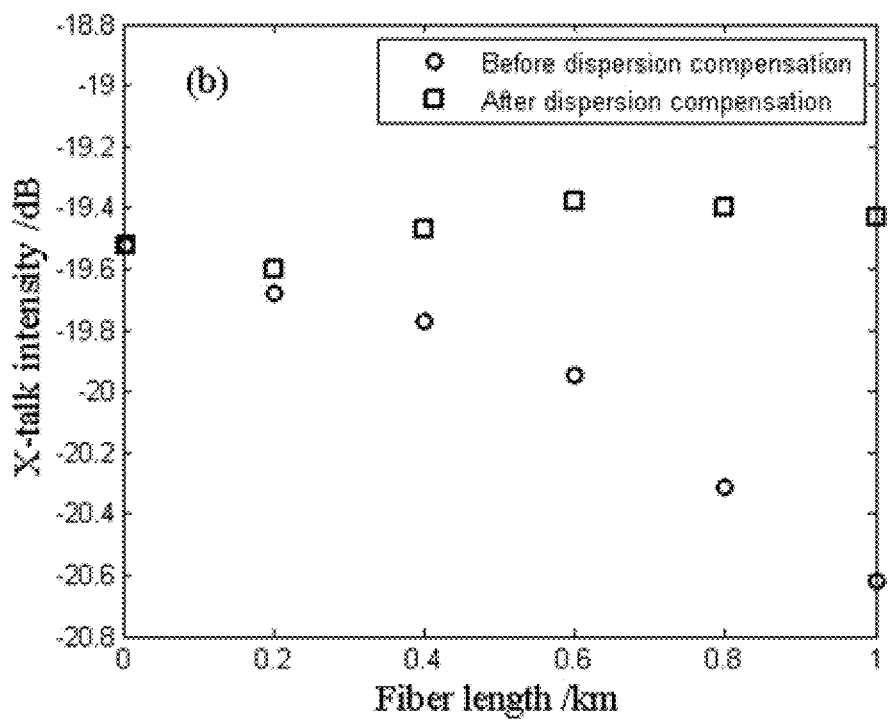
FIG. 7B shows exemplary measured values d crosstalk of the input connector with six different PM fiber lengths.

FIG. 7A shows an example of the envelop width of crosstalk peaks induced by stress at various locations along a PM fiber. The squares in FIG. 7A represent the envelope widths after the width broadenings of the cross-talk peaks are removed from the initial measured envelope widths represented by dots after the dispersion compensation is performed. FIG. 7B shows exemplary measured values d crosstalk of the input connector with six different PM fiber lengths (5m, 205m, 405m, 605m, 805m and 1005m). The crosstalk of the input connector is fixed and five segments of fibers with a length of 200m each are sequentially spliced to the pigtail of the input connector for increased dispersion. The amplitude of polarization cross-talk decreases with the fiber length Z due to birefringence dispersion and is restored after performing the compensation.

Therefore, the dispersion compensation technique can effectively mitigate the cross-talk amplitude reduction and the line broadening caused by the dispersion. As such, the described compensation technique can be used to effectively improve the spatial resolution and accuracy of cross-talk amplitude measurements using a broadband light source (e.g., a white-light) in optical interferometer based polarization cross-talk analyzers.

Referring back to the example of a sensor device configuration shown in FIG. 3, in one implementation, the polarized super luminescent diode source (SLED) may be configured to have a short coherence length (e.g., around 25 μm) and is coupled into the slow axis of a PM fiber under test (FUT) (point A). The example in FIG. 3 shows that, at another location point B, a polarization crosstalk is induced by an external disturbance which causes some light initially polarized in the slow axis of the PM fiber to be coupled into the fast axis of the PM fiber with a coupling coefficient parameter $h=I_1/I_2$, where $I_1$ and $I_2$ are the light intensities in the fast and slow axes of the PM fiber, respectively. Because the polarized lights along the fast axis travel faster than that along the slow axis, at output of the fiber the faster light component will be ahead of the slow component by $\Delta Z=\Delta nZ$, where $\Delta Z$ is an optical path length difference, $\Delta n$ is a group birefringence of the PM fiber and Z is the fiber length between the point where the crosstalk occurs (B) and the output end (point C). A polarizer oriented at 45° to the slow axis of the PM FUT was placed at the end of the fiber. Polarization components from both slow and fast axes were projected onto a same direction of the linear polarizer axis so as to produce interference pattern between those two components in a scanning Michelson interferometer. When the relative optical path length is scanned, an interference peak appears when these two polarization components are overlapped in the space but disappears when they are separated more than a coherence length of light source (i.e. SLED). Then the location of the crosstalk point B from exit point C can be calculated as $Z=\Delta Z/\Delta n$. If there are multiple polarization crosstalk points beyond the single location B shown in FIG. 3, second order interference peaks will occur because the light in the fast axis caused from the coupling at a crosstalk point will be coupled back to the slow axis at the subsequent crosstalk points down the fiber. Such second order couplings can cause ghost crosstalk peaks and result in confusions in simple white light interferometers. The sensor in FIG. 3 is an example of a ghost-peak-free distributed polarization crosstalk analyzer that uses a differential group delay (Delay Device) inside the device to remove the ghost crosstalk peaks from the second order couplings, making it possible to accurately identify and measure a large numbers of polarization crosstalks along a PM fiber without ambiguity. Some aspects of this ghost-peak-free sensing operation are explained in U.S. Pat. No. 8,599,385 and U.S. Patent Application Publication No. US2013/0321818 A1 of U.S. patent application Ser. No. 13/482,813.

Based on the features described above, the PM fiber can be embedded inside the sensor substrate as the stress sensing element and a strain field over the sensor can cause the polarization crosstalk in the PM fiber. The crosstalk change in the PM fiber can be used as an indicator that reflects a change in the external stress/strain that is exerted on the PM fiber. The polarization crosstalk in a PM fiber tends to be mostly sensitive to transversal stress exerted on the PM fiber, and, by comparison, is much less sensitive to the axial strain or stress. Therefore, the sensor in FIG. 3 can be used to measure the transversal stress and strain. However, in many applications, such as in structural monitoring, the parameters to be monitored are associated with the axial strain or stress. The sensing techniques and devices disclosed below are configured to convert the axial strain or stress into a transversal stress onto the PM fiber to enable the device in FIG. 3 and other sensor devices based on the sensing mechanism in FIG. 3 to detect and monitor axial stress or strain distributions to measure axial mechanical parameters. For example, both the transversal pressure and axial strain can be measured with the sensor strips or sheets disclosed in this document.

Polarization-maintaining (PM) optical fibers having a high internal birefringence that exceeds perturbing birefringence for maintaining a linear polarization along the fiber are important to fiber optic communications and fiber optic sensors, particularly fiber optic gyroscopes. The polarization maintaining ability of a PM fiber is generally characterized by polarization extinction ratio (PER) or h-parameter (PER per unit length), while the fundamental parameter governing the performance of a PM fiber is characterized by its modal birefringence (or equivalently beat length). Therefore, it is important for the manufacturers and the users of a PM fiber to know not only the PER, but also the birefringence and all other birefringence related parameters, including birefringence variations with wavelength (birefringence dispersion), with temperature (birefringence thermal coefficient), and along the fiber (birefringence uniformity). The PER or h-parameter of a PM fiber can be measured with a polarization cross-talk method specified in standards TIA-544-193 and TIA-544-192. However, in various implementations, such a measurement system can be cumbersome to set up and the measurement accuracy is susceptible to the birefringence of the lenses and connectors, as well as the misalignment of the polarization inputting to the PM fiber. Commercially available PER meters can be used to directly measure the PER of a PM fiber, however, the measurement accuracy are still limited by 1) the polarization misalignment of light at the input end of the PM fiber under test (FUT), and 2) the polarization misalignments of the light source and its fiber pigtail, and therefore making the measurement of high PER fibers cumbersome and less repeatable.

One or two of the four birefringence related parameters can be measured with different implementations of a white light interferometer, the spectral interferometery, a wavelength sweeping technique, a transient Brillouin grating technique, and the Brillouin optical correlation-domain reflectometry. Implementations of those methods tend to be complicated to setup and require in-depth knowledge and extensive know-how to implement. Consequently, their practical use in the industry has been limited.

A distributed polarization crosstalk analyzer (DPXA) can be used to accurately measure the thermal coefficient and dispersion of the birefringence PM fibers.

This document discloses techniques for using DPXA to obtain additional measurements by providing methods and processes to simplify the measurements and improve measurement accuracy, and to expand the measurement capabilities of DPXA to include various polarization related parameters, including PER (or h-parameter), birefringence, birefringence uniformity, birefringence dispersion, and birefringence thermal coefficient. This document includes a fixture for use with DPXA to induce a series of polarization crosstalk peaks of equal spacing to assist the measurements. To enable such methods and processes, we devise a mechanism inside the DPXA (e.g., a commercial device such as General Photonics PXA-1000) to specifically eliminate the ghost interference peaks caused by zero- and 2nd-order interferences of polarization crosstalks, and therefore make it possible to obtain the true locations and strengths of a large number of polarization crosstalks along the PM fiber without ambiguity.

As shown below, the combination of the fixture and ghost-peak elimination simplifies measurement process, reduces many potential measurement errors, and therefore assures accurate measurement results by least trained personnel. Furthermore, the DPXA can readily be used to identify polarization crosstalks induced by the connectors and splices in the measurement setup, and therefore eliminate their contributions to the total PER of a PM fiber under test (FUT), resulting more accurate measurement results without the needs of the careful polarization alignments of light at the input and output ends of the PM fiber under test (FUT). Finally, a set of measurement parameters obtained by a DPXA can be used to quantify the performance of a PM fiber, with test examples of different PM fibers.

The methods and processes of the disclosed technology in this document can be widely applied in the industry for the complete characterization of PM fibers. Referring back to FIG. 3, which illustrates a basic configuration for a distributed polarization crosstalk analyzer (DPXA). In one implementation of the DPXA, a polarized super luminescent diode source (SLED) with a very short coherence length (~25 μm) is coupled into the slow axis of a PM fiber under test (FUT) (point A of inset). Assume at point B, a polarization crosstalk is induced by an external disturbance and then some lights are coupled into the fast axis of the PM fiber with a coupling coefficient parameter $h = I_1/I_2$, where $I_1$ and $I_2$ are the light intensities in the fast and slow axes of the PM fiber, respectively. Because the polarized lights along the fast axis travel faster than that along the slow axis, at output of the fiber the faster light component will be ahead of the slow component by $\Delta Z = \Delta n Z$, where $\Delta Z$ is an optical path length difference, $\Delta n$ is a group birefringence of the PM fiber and Z is the fiber length between the point where the crosstalk occurs (B) and the output end (point C). A polarizer oriented at 45° to the slow axis of the PM FUT was placed at the end of the fiber. Polarization components from both slow and fast axes were projected onto a same direction of the linear polarizer axis so as to produce interference pattern between those two components in a scanning Michelson interferometer. When the relative optical path length is scanned, an interference peak appears when these two polarization components are overlapped in the space but disappears when they are separated more than a coherence length of light source (i.e. SLED). Then the birefringence $\Delta n$ of PM FUT between two positions B and C can be calculated as following $$\Delta n = \Delta Z / Z \tag{17}$$

It is evident from Eq. (17) that the accuracy of $\Delta n$ depends on the measurement accuracies of both $\Delta Z$ and Z.

The DPXA device in FIG. 3 illustrates the device operation when there is only one polarization crosstalk point along the fiber. If there are multiple polarization crosstalk points, second order interference peaks will occur. That is, the light in the fast axis caused from the coupling at a crosstalk point will couple back to the slow axis at the subsequent crosstalk points down the fiber. These second order couplings will cause ghost crosstalk peaks and result in confusions in simple white light interferometers. As mentioned above, a special technique (not shown here in FIG. 3) inside a DPXA can be applied to remove all the ghost crosstalk peaks from the second order couplings, making it possible to accurately identify and measure a large numbers of polarization crosstalks along a PM fiber without ambiguity.

Figure 8:
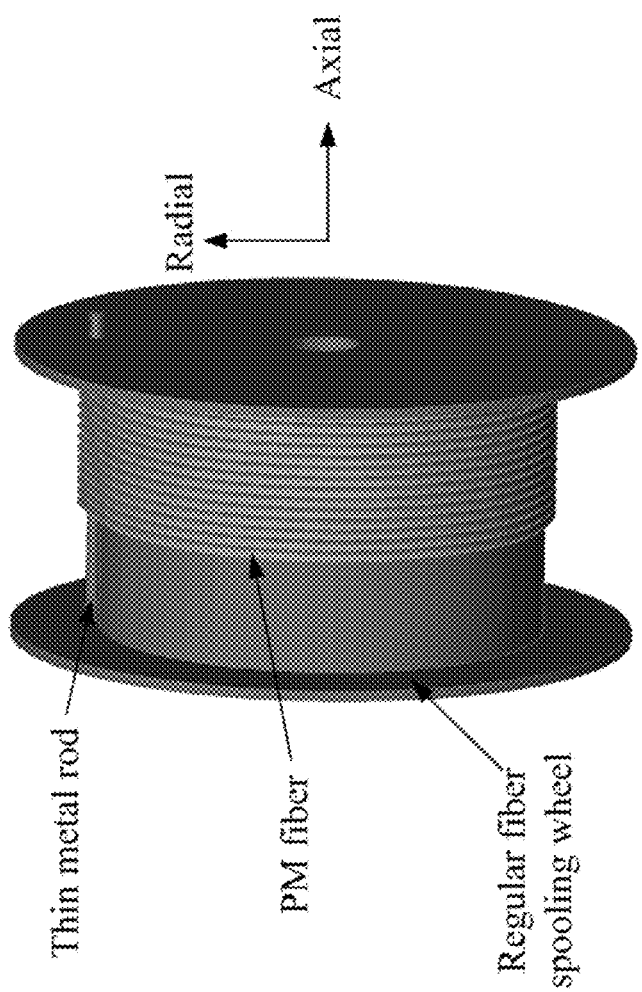
FIG. 8 shows an example of a fixture having a length of PM fiber wound on a fiber spool and stressed by a thin metal rod to induce periodic transversal strains on the PM fiber at locations the fiber being in contact with the rod, causing periodic polarization crosstalks for light propagating in the fiber, with a spacing defined by the circumference of the spool.
Figure 9:
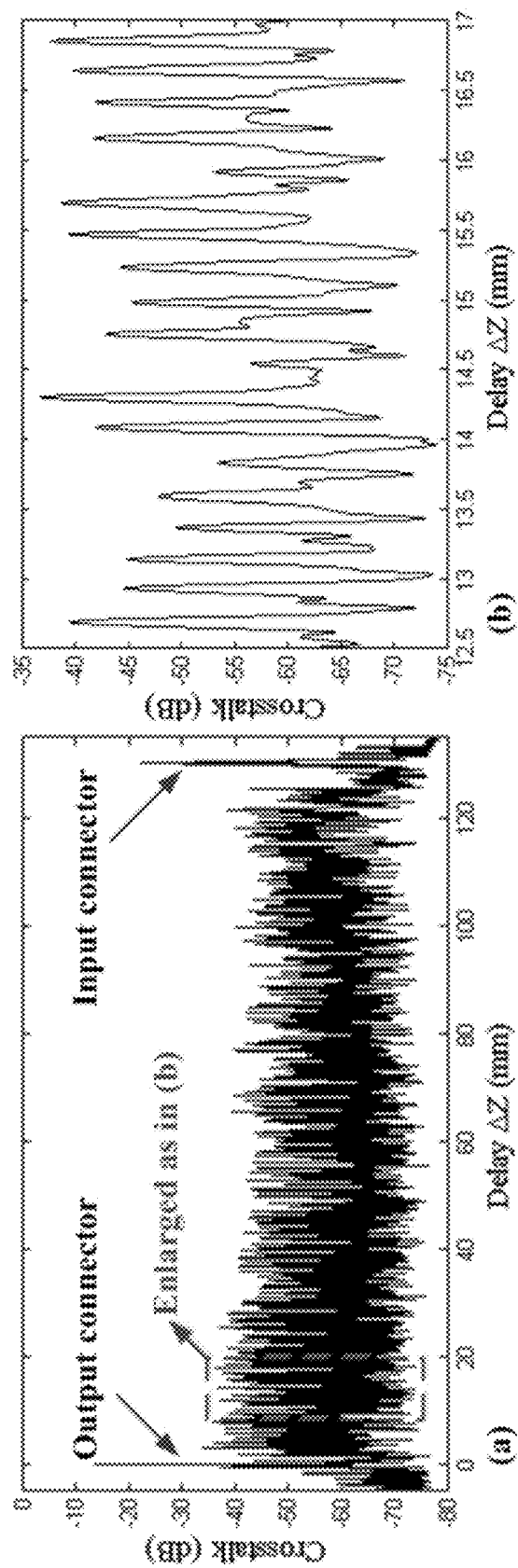
FIG. 9 shows measurements of a system having the fixture in FIG. 8 and the DPXA in FIG. 3.

Fixture to Induce Periodically Spaced Polarization Crosstalk Peaks Along a PM Fiber To facilitate easy and accurate measurements of birefringence related parameters, a spool-like fixture can be used as a pre-DPXA device to induce periodically spaced polarization crosstalk peaks along a PM fiber under test (FUT), as shown in FIG. 8. In testing such a prototype fixture, a standard fiber spool from a fiber manufacturer was used and a thin metal rod with a diameter of 2 mm across its width was affixed to the side of the spool. A single layer of FUT with a length of 280 m is then wound on the spool and the metal rod with a certain tension. Under this condition, "point-like" stresses are automatically applied to the fiber at the points where the fiber goes across the metal rod to produce multiple periodic polarization crosstalks, with a periodicity precisely defined by the circumference (0.535 m in the experiment) of the fiber spool, as shown in FIG. 9. These periodic crosstalk peaks act like embedded ruler marks on the fiber, which automatically give out precise length information essential for birefringence related measurements, as required by Eq. (17).

In practice, such a spool-like fixture can be machined with a precise predetermined diameter (or circumference) and with a thin slot or bump across its width to induce periodic polarization crosstalks, making the embedded ruler more accurate. Such a fixture can be used to precisely define the lengths between crosstalk peaks, because the accuracy of birefringence measurement is proportional to the accuracy of such lengths, as shown in Eq. (17). In addition, this fixture can be used to create a distribution of crosstalk peaks to reflect the local birefringences along the fiber.

Birefringence and Birefringence Uniformity Measurements

FIG. 9(a) is the measured polarization crosstalk curve of a PM PANDA fiber with a diameter of 6 μm, a cladding of 80 μm, and a buffer of 165 μm as a function of fiber length Z, showing the polarization crosstalks induced by the line-pressure from the metal rod on the fiber. The peaks at far left and right correspond to polarization crosstalks induced at the output and input connectors respectively due to slightly misalignment of lights coupling into the fiber axis. FIG. 9(b) shows the detailed view of the equidistant periodic crosstalk peaks caused by transversal pressures induced whenever the fiber crosses the metal rod. These measured crosstalk amplitudes tend to vary from peak to peak because of the angle variation between the direction of transversal pressure and the fiber's principal axes during winding the fiber onto the spooling wheel, however such an amplitude variation does not affect the periodicity measurement which is important to the birefringence measurement. The spacing between any two stress crosstalk points can be readily obtained by simply multiplying the circumference of spool with the number of stress-induced crosstalk peaks between two points. In addition, the relative delay $\Delta Z$ with the encoder of motorized delay line can also be precisely obtained.

When Eq. (17) is used to obtain $\Delta n$, the total relative error $\delta_{\Delta n}/\Delta n$ can be expressed as:

$$\delta_{\Delta n}/\Delta n = \sqrt{(\delta_{\Delta Z}/\Delta Z)^2 + (\delta_Z/Z)^2} = \sqrt{(\delta_{\Delta Z}/\Delta n)^2 + (\delta_Z)^2}/Z \tag{18}$$

where $\delta_{\Delta n}$ is the birefringence inaccuracy, $\delta_{\Delta z}$ is the reading error of the delay $\Delta Z$ of the variable delay line inside the DPXA, and $\delta_z$ is the measurement error of length Z. In other methods, the absolute length of FUT must be accurately measured in order to obtain an accurate birefringence $\Delta n$ according to Eq. (18). Any length measurement error will proportionally contribute to the accuracy of $\Delta n$. In contrast, here we can use the relative length defined by the circumference of the fiber spool to eliminate the need of absolute length measurement and its associated error, and Eq. (17) can be rewritten as:

$$\Delta n = N \delta z/(Nl) \tag{19}$$

where $\delta z$ is the periodicity of the crosstalk peaks of the delay in the interferometer, l is the circumference of the fiber spool, and N is an integer to represent the number of periods we choose in the calculation. Because l is precisely defined, the error contribution from the length measurement can be minimized. The only error source left for $\Delta n$ is from the relative location inaccuracy $\delta_{\Delta z}$ between the polarization crosstalk peaks measured with the variable delay line inside the DPXA. Note that the delay line generally has an error independent of the traveling distance, we therefore choose to use multiple periodicities (N>>1) in the experiment to reduce the effect of delay line error $\delta_{\Delta z}$, similar to the case of measuring the thickness of a stack of papers in order to accurately determine the thickness of a single paper. We found in our experiment that when N>=5, the measurement uncertainty is sufficiently small. The average $\Delta n$ obtained when N=5 is $\Delta n=4.65\times10^{-4}$.

Figure 10:
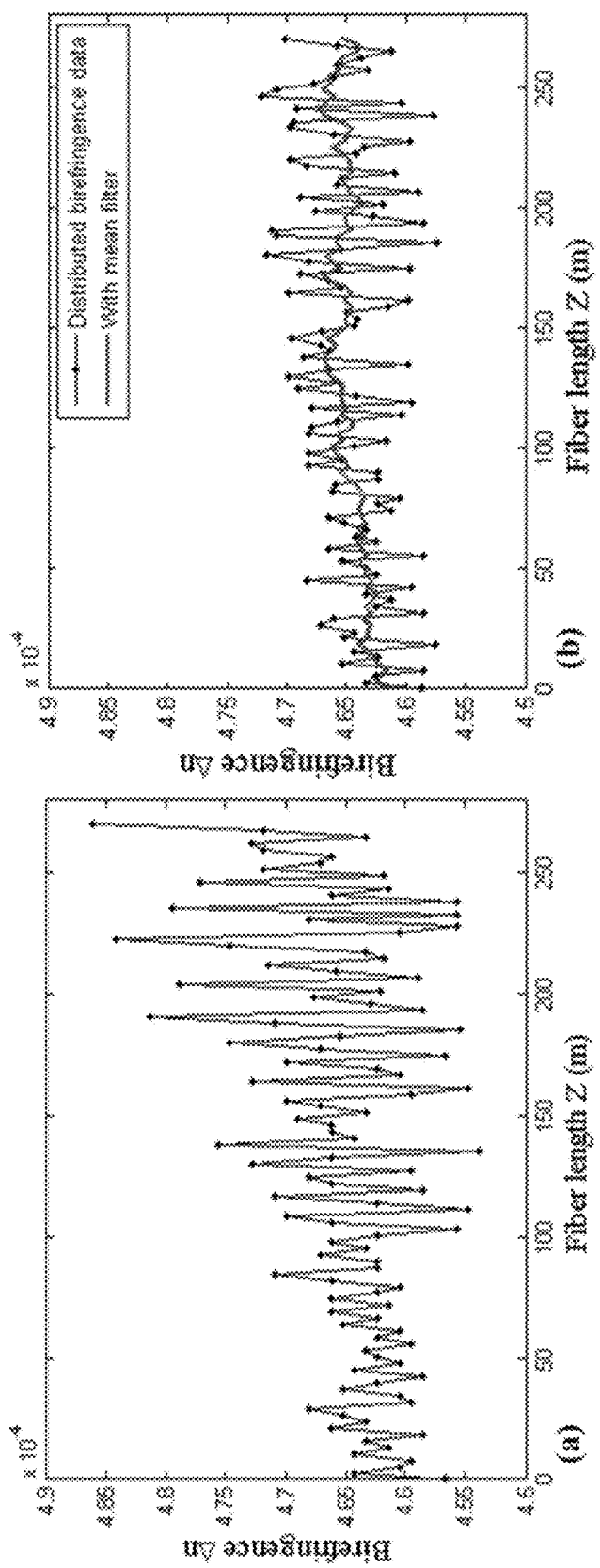
FIG. 10 includes FIG. 10(a) and FIG. 10(b).

FIG. 10(a) shows the variation of $\Delta n$ as a function of distance along the fiber for the case of N=5. The large data fluctuations at large distances are caused by the dispersion induced peak broadening due to the birefringence dispersion, because the broadening increase the uncertainty of $\delta_{\Delta z}$ in Eq. (18). Dispersion compensation procedures can be used to further improve the measurement accuracy by multiplying the distributed crosstalk curve with a dispersion compensation function when birefringence dispersion of the FUT is measured.

FIG. 10(b) shows the measured birefringence as a function of distance along the fiber, showing that the measurement uncertainties are greatly reduced when the dispersion compensation procedure is applied. It is also evident that the mean $\Delta n$ slightly varies along the fiber length for the FUT.

Birefringence Dispersion Measurement

The envelope of a measured crosstalk peak (i.e. the interference peak) is influenced by SLED's spectral distribution and birefringence dispersion $\Delta D$ of the PM fiber. In fact, the envelope width increases quadratically with the distance Z due to effect of the birefringence dispersion, and a relationship between envelop broadening W and birefringence dispersion $\Delta D$ can be expressed as $$W/W_o=(1+(\alpha\Delta D)^2 Z^2)^{1/2} \quad (20)$$

where $$\alpha=2\pi c(\Delta\lambda/\lambda_0)^2 \quad (21)$$

where, c is the speed of light in vacuum, $\Delta\lambda$ and $\lambda_0$ are the light spectral width and center wavelength of the light source used for the measurement, respectively, and $W_0$ is the 1/e width of the interference envelope when the dispersion $\Delta D$ or Z equals to zero. The widths of any two polarization crosstalk peaks with a known spacing Z between them can be measured to obtain the dispersion $\Delta D$ using Eq. (20). However, in order to increase measurement accuracy of $\Delta n$, widths of crosstalk envelops at multiple locations along the PM FUT are measured, and $\Delta D$ is then obtained by curve-fitting to Eq. (204).

Figure 11:
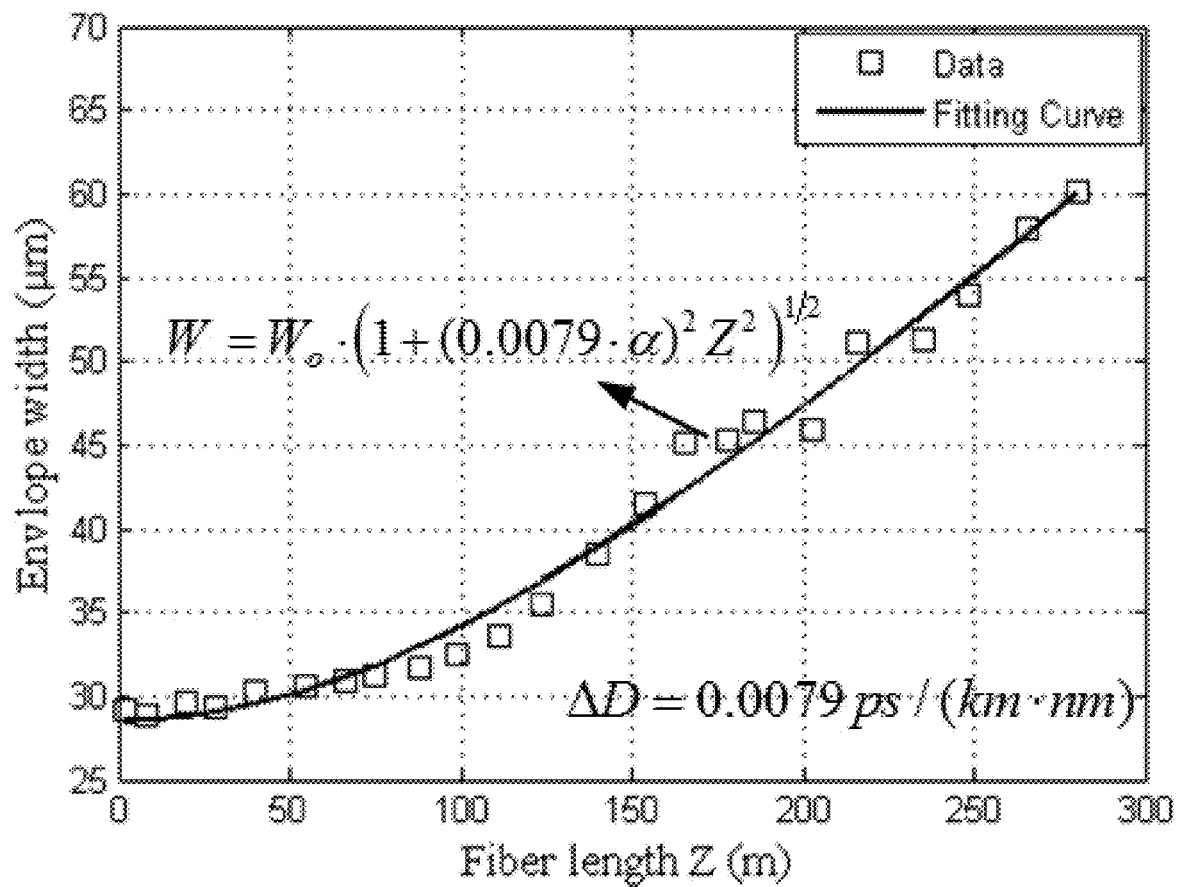
FIG. 11 shows measurements of envelope widths of crosstalk peaks induced by stress at various locations along the fiber. The envelope widths of polarization cross-talk peaks broaden as fiber length increase due to birefringence dispersion. Curve-fitting obtains the birefringence dispersion of the FUT to be $\Delta D=0.0079$ ps/(km·nm).

FIG. 11 shows the widths of the crosstalk peaks as a function of their locations along the fiber. The distance is measured from the first induced crosstalk peak and evaluated every 20 peaks (N=20 or 10.7 m). Different from other techniques where the locations of crosstalk peaks were calculated using Eq. (17) where the total fiber length Z must be measured precisely, here only the relative locations are required and they can be precisely obtained by multiplying circumference of the fixture with the peak number, minimizing the error contribution of fiber distance in dispersion measurement. It may be possible that the birefringence dispersion may be obtained using Eq. (20) by measuring the widths of the crosstalk peaks caused by the output and input connectors, however, the error of the fiber distance measurement in this approach also contributes to the dispersion measurement, and, additionally, such a two-point measurement is undesirably sensitive to measurement uncertainties of the widths. The method presented here can effectively avoid such error sources. As can be seen from FIG. 11, the widths of cross-talk peak start to show significant broadening at a distance large than 100 m. The birefringence dispersion $\Delta D$ of the PM fiber is accurately obtained by a least-square fitting to Eq. (20) to be $\Delta D=0.0079$ ps/(km·nm).

Note that a dispersion compensation function can be obtained once $\Delta D$ of the fiber is determined. This dispersion compensation function can be used to remove the broadening of the crosstalk peaks and hence reduce the measurement uncertainties of the birefringence along the fiber.

Birefringence Thermal Coefficient Measurement

The PM fiber is expected to be sensitive to the temperature because of its anisotropic strain that is resulted from differential thermal expansion at different regions in the fiber cladding and is varied linearly with temperature in the vicinity of room temperature. The birefringence $\Delta n$ can be written as $$\Delta n=\gamma(T_0-T) \quad (22)$$

where T is the temperature of FUT, $T_0$ is the softening temperature of the silica glass with dopants in the stress—inducing region of the cladding, and $\gamma$ is the thermal coefficient of birefringence of the PM fiber to be measured.

Figure 12:
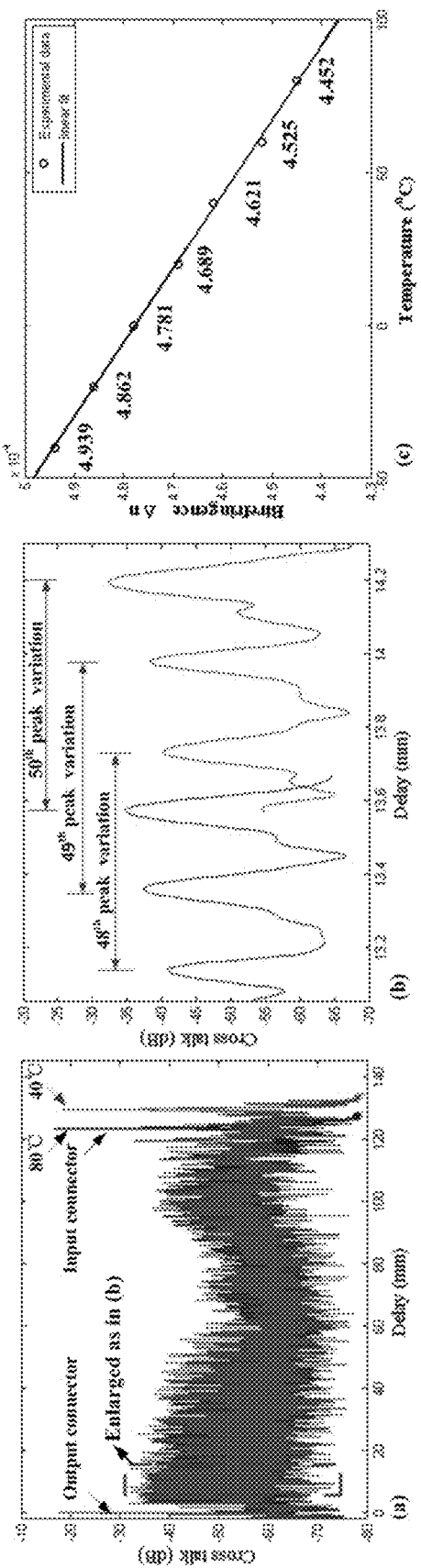
FIG. 12 shows measurements made with a temperature-controlled chamber that encloses the fixture in FIG. 8.

Referring to FIG. 8, the fiber spool can be placed into a temperature-controlled chamber, with two fiber pigtails outside of the chamber. FIG. 12 shows FIG. 6(a) shows two typical polarization crosstalk curves of PM FUT as a function of relative delay for two different temperatures of 80° C. and 40° C. Clearly, the positions of all polarization crosstalk peaks are shifted with the temperature, as predicted in Eq. (22). The thermal coefficient of birefringence can be obtained by measuring the position of the crosstalk peak induced by the input connector as a function of temperature. However, there are two major error sources affecting the measurement accuracy: 1) fiber length measurement error, and 2) the fiber length outside the temperature chamber. In order to make accurate measurement, the fiber inside the chamber must be sufficiently long and the fiber pigtails must be kept sufficiently short.

In this section, we show that both the error sources can be effectively minimized for the following reasons: 1) because the periodic polarization crosstalk peaks induced by the measurement fixture acts as ruler marks along the fiber, the fiber length measurement between any two peaks can be easily obtained with a high precision, and 2) we only measure the relative position variations with temperature between any two periodic crosstalk peaks on the fiber section inside the chamber, and therefore eliminate the error contribution of fiber sections outside of the chamber. In experiment, we choose to measure the spacing $\Delta Z$ between the $1^{st}$ and $50^{th}$ peaks, and measure the birefringence $\Delta n$ as a function of temperature. As shown in FIG. 12(b), the peak positions of the $48^{th}$, $49^{th}$, and $50^{th}$ peaks shifted to the left as temperature increase, reducing the spacing $\Delta Z$. The fact is that the spacing $\Delta Z$ decreases with the temperature indicates that $\Delta n$ has a negative thermal coefficient. As mentioned previously a thermal coefficient of the group birefringence $\gamma$ can be obtained by linear-fitting of $\Delta n$ to Eq. (22) by using the least square fitting method at each different temperatures. Note that in order to reduce the effect of dispersion, we choose the crosstalk peaks close to the output end of the fiber under test, although dispersion compensation may also be used to reduce the peak broadening and improving measurement accuracies for measuring peaks closing to the input connector (N>>50).

Measurement of Polarization Extinction Ratio (PER) of PM Fibers

Various other methods for measuring the PER of a PM fiber tend to be susceptive to (1) polarization misalignment at the input end of the fiber under test (FUT), and/or (2) polarization misalignment between the light source and its fiber pigtail if pigtailed light source is used. A DPXA in FIG. 3 can be used to readily identify the crosstalk contributions from the polarization misalignments at the two fiber ends, as well as at the interface between the pigtail and the light source, and eliminate their contributions to the total PER, because the corresponding polarization crosstalk peaks measured with a DPXA are spatially separated.

Figure 13:
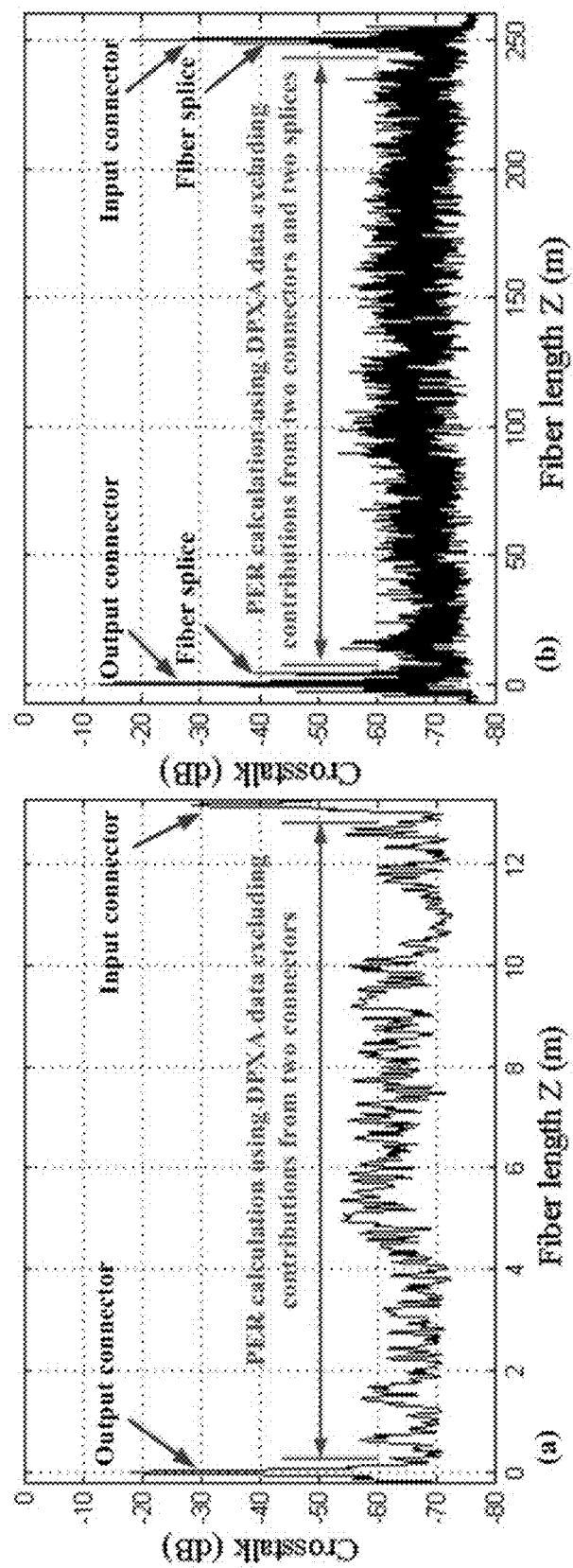
FIG. 13 shows PER measurements.

FIG. 13 shows the measured polarization crosstalk curves of a PM fiber jumper with FC/PC connectors and a spool of PM fiber of 250 meter directly from a PM fiber vendor, fusion spliced with two FC/PC connectors. When a FUT is connected to the DPXA, the polarization misalignment at the connection points induces significant crosstalk peaks. An auto-search program is implemented in the DPXA software to automatically identify those peaks, because the polarization crosstalk signatures of the fibers inside DPXA are known, as shown in FIG. 13. In addition, the polarization crosstalk peak resulting from the light source and its pigtail is located outside the region defined by the two connectors, and thus is not included for PER calculation. By definition, the PER of the fiber can be calculated as:

$$PER=10 \log(P_f/P_s) \quad (23)$$

where $P_f$ is the total power coupled to the fast axis from the slow axis and can be obtained by integrating of all polarization crosstalks between the two connectors, and $P_s$ is the total power remain in the slow axis $P_s=P-P_f$, where P is the total received power at the fiber output.

This disclosed technology in this document includes an algorithm in DPXA software to automatically calculate the PER excluding the contributions of the two end connectors from the crosstalk measurement curve, as shown in FIG. 13(a). The DPXA software can also be used to calculate the total PER contribution between any two points along the fiber, and therefore to further exclude the contributions from the two fusion splicing points, as shown in FIG. 13(b).

Table 1 below is provided to compare multiple PER measurement results of a 13 meter fiber jumper and a 250 meter PM fiber coil obtained with a commercial PER meter and a DPXA. It is evident that the PER value obtained by PER meter is several dB smaller than that obtained with a DPXA, due to the contributions of crosstalk from the polarization misalignment at the input connector. In addition, the measurement repeatability of a DPXA is much better that that of using a PER meter. Therefore, it is much easier to use a DPXA to obtain more accurate PER measurements than using a PER meter.

TABLE 1

Comparison of PER measurements of a 13 m PM fiber jumper and a 250 m PM fiber coil obtained with a commercial PER meter and a DPXA

| Measurement # | PER of Fiber jumper | | PER of Fiber coil | |
|---|---|---|---|---|
| | ERM (dB) | DPXA (dB) | ERM (dB) | DPXA (dB) |
| 1 | 22.5 | 34.81 | 25.7 | 30.82 |
| 2 | 24.9 | 34.27 | 21.8 | 30.81 |
| 3 | 23.3 | 35.06 | 25.4 | 30.31 |
| 4 | 26.8 | 34.64 | 22.5 | 30.90 |

TABLE 1-continued

Comparison of PER measurements of a 13 m PM fiber jumper and a 250 m PM fiber coil obtained with a commercial PER meter and a DPXA

| Measurement # | PER of Fiber jumper | | PER of Fiber coil | |
|---|---|---|---|---|
| | ERM (dB) | DPXA (dB) | ERM (dB) | DPXA (dB) |
| 5 | 25.8 | 35.14 | 23.8 | 31.09 |
| Uncertainty (Max-MM) (dB) | 4.3 | 0.87 | 3.9 | 0.78 |

PM Fiber Quality Evaluation

By the July of 2014 around the time for filing U.S. Provisional Patent Application No. 62/029,387, various commercial devices for PM fiber measurements can only measure PER or h-parameter for a user to characterize the polarization performance of a PM fiber. Measurements of PER or h-parameter, however, may not be able to reflect the true polarization performance of the fiber, especially considering that PER measurement using conventional methods may have significant fluctuations. In this regard, this document provides a technique that uses set of parameters from a single DPXA scan to fully describe the performance without ambiguity.

FIG. 12 shows DPXA scans of three different PM fibers measured directly with commercial fiber on the fiber spool as the fixture shown in FIG. 8. Four parameters are proposed here to characterize the quality of a PM fiber for the polarization related performance: 1) the average polarization crosstalk, 2) the maximum crosstalk, 3) the number of crosstalk peaks above a certain threshold defined by the manufacturer or the user, and 4) PER. The average crosstalk is the major contributor to the value of PER and closely relates to h-parameter (PER per fiber length). The maximum crosstalk is an indication whether the PM fiber is degraded or damaged during manufacturing, packing or shipping of the PM fiber, although a single or few high crosstalk peaks contribute insignificantly to the total PER of a long fiber. For some applications, such as fiber gyro coils, the high crosstalk sections must be removed to assure high quality fiber coil production. A large number of high crosstalk peaks present in the fiber may indicate problems in fiber drawing or packaging process. It also makes it impractical to sort out only good fiber sections for demanding applications.

TABLE 2

Four parameters to fully characterize the quality of three different PM fibers

| | Average crosstalk (dB) | Maximum crosstalk (dB) | Number of crosstalk peaks above −55 (dB) | PER (dB) |
|---|---|---|---|---|
| Fiber I | −73.87 | −42.36 | 1 | 28.8 |
| Fiber II | −66.78 | −51.88 | 23 | 23.6 |
| Fiber III | −59.22 | −42.15 | 1711 | 16.5 |

Figure 14:
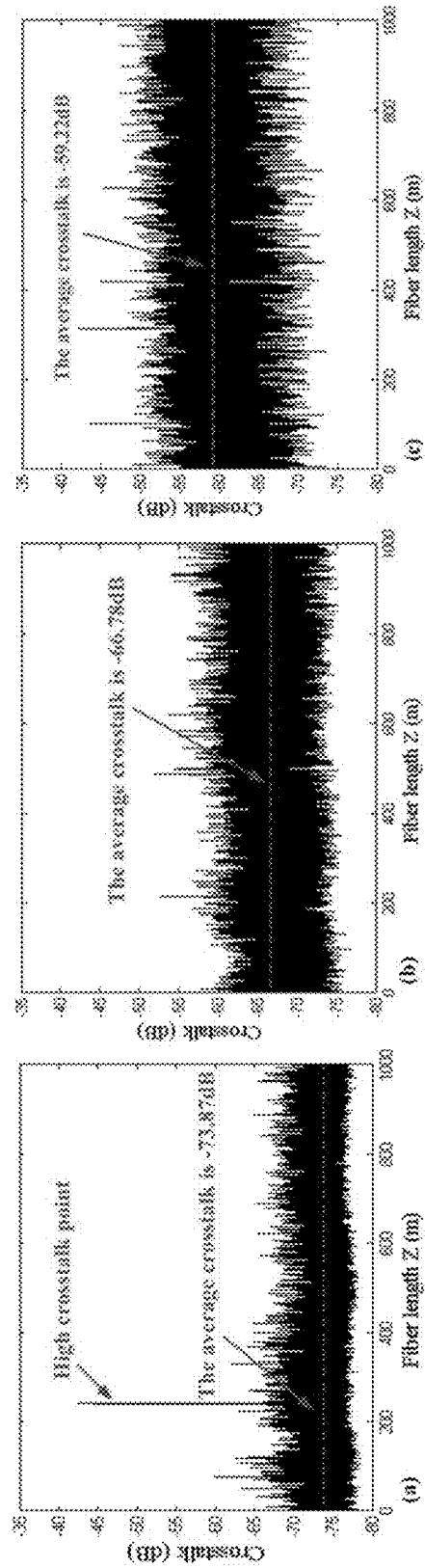
FIG. 14 shows measurements of polarization cross-talk curves of three different PM fibers.

Table 2. lists four parameters of the three different fibers under test, obtained from FIG. 14. Fiber I is a commercial PANDA fiber at 1310 nm with a beat length of 2.57 mm, a core diameter of 6 μm, a cladding diameters of 125 μm, and a buffer diameter of 250 μm respectively. Fiber II is a different PANDA fiber at 1310 nm having the same core as Fiber I, but a different beat length of 2.13 mm, a cladding diameters of 80 μm, and buffer diameters of 169 μm respectively. Finally, Fiber III is third type of PM fiber at 1310 nm with a beating length of 2.6 mm, a core diameter of 6.4 µm, a cladding diameter of 80, and a buffer of 136 µm. It is evident from FIG. 14(a) that Fiber I has the lowest average crosstalk, resulting in a highest PER of 28.78 dB, however, it has a defect point about 220 m from the output connector with a high crosstalk peak of −42.36 dB, probably caused by mishandling when winding the fiber to the spool. Such a defect cannot be identified with a simple PER measurement. We find in experiments that such a defect may be permanent, e.g. cannot be recovered even when the corresponding stress is released. On the other hand, Fiber III has the highest average crosstalk of −59.22 dB, corresponding to a low PER of 16.25 dB. It also has a large number of high crosstalk peaks above −55 dB, probably because the thin buffer layer (136 µm) cannot effectively protect the fiber from external stresses. Therefore, all four parameters collectively give a full picture of the quality or performance of the PM fiber under test.

Therefore, this patent document describes devices, methods and processes of using a ghost-peak-free DPXA to fully characterize all polarization related parameters of a polarization-maintaining fiber, including birefringence (beat length), birefringence variation along the fiber, birefringence dispersion, birefringence temperature coefficient, and PER. In particular, a fixture can be used to induce periodic polarization crosstalk peaks with equal spacing and measure the locations and widths of the peaks to obtain all birefringence related parameters. The periodicity defined by the circumference of the fixture can be used as a build-in ruler to avoid the need for measuring the fiber length because measurement errors in the fiber length can lead to a significant error for the birefringence measurement. In addition, a DPXA is shown to be capable to identify crosstalks caused by the polarization misalignments at the fiber input and output ends, as well as at the fiber pigtail of the light source, and to eliminate their contributions to the PER of the fiber, enabling easier and more accurate PER measurements. Furthermore, a set of parameters from the DPXA measurement of a PM fiber is used to fully quantify its polarization related performance. The disclosed technology can be readily applied in the industry to completely characterize PM fibers with ease and with high repeatability.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. A method for measuring polarization-related parameters in a birefringent material; comprising:
    engaging a fixture having a spatially periodic structure to a birefringent material along a length-wise direction of the birefringent material to cause polarization crosstalk peaks at different stressed and periodic spatial locations having a known spacing between two adjacent stressed and periodic spatial locations as defined by the spatially periodic structure where each crosstalk peak is generated by coupling light in one optical polarization supported by the birefringent material into another different optical polarization supported by the birefringent material at each stressed spatial location;
    directing probe light into the birefringent material having the stressed and periodic spatial locations to cause coupling between different optical polarizations supported by the birefringent material;
    detecting the probe light coming out of the birefringent material to determine spatial positions and spatial widths of the induced polarization crosstalk peaks; and
    using the determined spatial positions and spatial widths of the induced polarization crosstalk peaks to extract one or more polarization-related parameters of the birefringent material including a birefringence thermal coefficient that is measured based on both (1) a shift in spatial position of one of the polarization crosstalk peaks and (2) the known spacing between two adjacent stressed and periodic spatial locations as defined by the spatially periodic structure.

2. The method as in claim 1, wherein the one or more polarization-related parameters of the birefringent material include birefringence (or a beat length) of the birefringent material.

3. The method as in claim 1, wherein the one or more polarization-related parameters of the birefringent material include a spatial birefringence variation along the birefringent material.

4. The method as in claim 1, wherein the one or more polarization-related parameters of the birefringent material include birefringence dispersion of the birefringent material.

5. The method as in claim 1, wherein the one or more polarization-related parameters of the birefringent material include a birefringence temperature coefficient of the birefringent material.

6. The method as in claim 1, wherein the one or more polarization-related parameters of the birefringent material include birefringence (or a beat length) of the birefringent material, a spatial birefringence variation along the birefringent material, or birefringence dispersion of the birefringent material.

7. The method as in claim 1, wherein the determined spatial positions and spatial widths of the induced polarization crosstalk peaks are used to extract a collection of polarization-related parameters of the birefringent material,
    wherein the collection includes birefringence (or a beat length) of the birefringent material, a spatial birefringence variation along the birefringent material, birefringence dispersion of the birefringent material, and a birefringence temperature coefficient of the birefringent material.

8. The method as in claim 1, wherein the birefringent material is a polarization maintaining fiber link.

9. A device for measuring distribution of polarization coupling in a length of polarization maintain (PM) fiber, comprising:
a structure engaged to a length of PM fiber and having a spatially periodic structure with a known spatial period to cause a series of polarization crosstalk peaks along the length of PM fiber at different stressed and periodic spatial locations where each crosstalk peak is generated by coupling light in one optical polarization mode supported by the PM fiber into another orthogonal optical polarization mode supported by the PM fiber at each stressed spatial location;
a mechanism that couples a linearly polarized light of a broadband spectrum into the length of PM fiber;
an optical delay device located downstream from the PM fiber in an optical path of an optical output signal out of the PM fiber to produce a modified optical output signal, the optical delay device structured to cause an added optical delay greater than an optical delay between the two orthogonal polarization modes caused by the PM fiber in the optical output signal to produce the modified optical output signal;
a linear optical polarizer which is polarized in a direction to cause a mixing between the two orthogonal polarization modes in optical transmission light of the linear optical polarizer, the linear optical polarizer placed in an optical path of the modified optical output signal to produce the optical transmission light;
an optical interferometer located to receive the optical transmission light of the linear optical polarizer and structured to obtain optical interference of light between the two orthogonal polarization modes in the PM fiber; and
a processing device that processes the obtained optical interference to identify spatial positions and spatial widths of polarization cross talks between the two orthogonal polarization modes in the PM fiber at the induced series of polarization crosstalk peaks, and uses the determined spatial positions and spatial widths of the induced polarization crosstalk peaks to extract one or more polarization-related parameters of the PM fiber,
wherein the processing device extracts a birefringence thermal coefficient of the PM fiber based on both (1) a shift in spatial position of one of the polarization crosstalk peaks and (2) the known spacing between two adjacent stressed and periodic spatial locations as defined by the spatially periodic structure.

10. The device as in claim 9, wherein the one or more polarization-related parameters of the PM fiber include birefringence (or a beat length) of the PM fiber.

11. The device as in claim 9, wherein the one or more polarization-related parameters of the PM fiber include a spatial birefringence variation along the PM fiber.

12. The device as in claim 9, wherein the one or more polarization-related parameters of the PM fiber include birefringence dispersion of the PM fiber.

13. The device as in claim 9, wherein the one or more polarization-related parameters of the PM fiber include a birefringence temperature coefficient of the PM fiber.

14. The device as in claim 9, wherein the processing device uses the determined spatial positions and spatial widths of the induced polarization crosstalk peaks to extract a collection of polarization-related parameters of the PM fiber including birefringence (or a beat length) of the PM fiber, birefringence variation along the PM fiber, birefringence dispersion of the PM fiber, and a birefringence temperature coefficient of the PM fiber.

\* \* \* \* \*